United States Patent
Chen et al.

(10) Patent No.: US 9,008,176 B2
(45) Date of Patent: Apr. 14, 2015

(54) COMBINED REFERENCE PICTURE LIST CONSTRUCTION FOR VIDEO CODING

(75) Inventors: Ying Chen, San Diego, CA (US); Muhammed Zeyd Coban, Carlsbad, CA (US); Wei-Jung Chien, San Diego, CA (US); Marta Karczewicz, San Diego, CA (US); Peisong Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 13/274,196

(22) Filed: Oct. 14, 2011

(65) Prior Publication Data

US 2012/0189053 A1 Jul. 26, 2012

Related U.S. Application Data

(60) Provisional application No. 61/435,271, filed on Jan. 22, 2011, provisional application No. 61/435,281, filed on Jan. 22, 2011, provisional application No. 61/450,545, filed on Mar. 8, 2011, provisional application No. 61/490,557, filed on May 26, 2011.

(51) Int. Cl.
*H04N 7/12* (2006.01)
*H04N 19/51* (2014.01)
(Continued)

(52) U.S. Cl.
CPC ......... *H04N 7/462* (2013.01); *H04N 19/00715* (2013.01); *H04N 19/00545* (2013.01);
(Continued)

(58) Field of Classification Search
CPC .................. H04N 19/00018; H04N 19/00024; H04N 19/00218; H04N 19/00266; H04N 19/00272; H04N 19/00545; H04N 19/00696; H04N 19/00715; H04N 19/00721; H04N 19/00884; H04N 19/26946; H04N 19/34; H04N 19/36; H04N 19/38; H04N 19/8451
See application file for complete search history.

(56) References Cited

U.S. PATENT DOCUMENTS 7,400,681 B2  7/2008  Joch et al.
7,835,451 B2  11/2010 Soh et al.
(Continued)

FOREIGN PATENT DOCUMENTS

WO   2010126612 A2   11/2010

OTHER PUBLICATIONS

Flierl et al., "Generalized B Pictures and the Draft H.264/AVC Video Compression Standard," IEEE Transactions on Circuits and Systems for Video Technology, vol. 13. No. 7, Jul. 2003, 12 pp.
(Continued)

*Primary Examiner* — Thuong (Tina) Nguyen
*Assistant Examiner* — Michael Bennett
(74) *Attorney, Agent, or Firm* — Shumaker & Sieffert, P.A.

(57) ABSTRACT

This disclosure relates to techniques for constructing a combined reference picture list, List C, based on List 0 and List 1, used for uni-directional prediction of video blocks in any direction. The techniques include coding one or more syntax elements defined to indicate construction information for List C, and performing reference picture list construction for List C from List 0 and List 1 based on the syntax elements. The one or more syntax elements may indicate that List C is used for uni-directional prediction, and may also indicate a number of reference pictures identified in List C and a reference index of a reference picture for each entry in List C. Each coded video block of a B slice may have an associated syntax element, i.e., inter_pred_idc, to indicate whether the video block is bi-predicted from List 0 and List 1 (Bi) or uni-directional predicted from List C (Pred_LC).

32 Claims, 8 Drawing Sheets

(51) Int. Cl.
*H04N 19/46* (2014.01)
*H04N 19/70* (2014.01)
*H04N 19/577* (2014.01)
*H04N 19/102* (2014.01)
*H04N 19/147* (2014.01)
*H04N 19/176* (2014.01)
*H04N 19/189* (2014.01)
*H04N 19/00* (2014.01)
*H04N 19/573* (2014.01)
*H04N 19/105* (2014.01)

(52) U.S. Cl.
CPC ... *H04N19/00884* (2013.01); *H04N 19/00721* (2013.01); *H04N 7/26015* (2013.01); *H04N 7/26154* (2013.01); *H04N 7/26244* (2013.01); *H04N 7/26313* (2013.01); *H04N 7/26946* (2013.01); *H04N 7/366* (2013.01); *H04N 19/00024* (2013.01); *H04N 19/00278* (2013.01); *H04N 19/00175* (2013.01)

(56) References Cited

U.S. PATENT DOCUMENTS

| | | | |
|---|---|---|---|
| 7,852,916 | B2 | 12/2010 | Duvivier |
| 8,520,961 | B2 * | 8/2013 | Choi et al. ............ 382/238 |
| 2005/0185713 | A1 | 8/2005 | Winger et al. |
| 2008/0101474 | A1 * | 5/2008 | Chiu et al. ............ 375/240.24 |
| 2009/0067505 | A1 | 3/2009 | Tourapis et al. |
| 2009/0116558 | A1 | 5/2009 | Chen et al. |
| 2009/0238269 | A1 | 9/2009 | Pandit et al. |
| 2010/0008415 | A1 | 1/2010 | Kajita |
| 2010/0020871 | A1 | 1/2010 | Hannuksela et al. |
| 2010/0080301 | A1 | 4/2010 | Chujoh et al. |
| 2010/0104014 | A1 | 4/2010 | Koo et al. |
| 2010/0158120 | A1 | 6/2010 | Fang et al. |
| 2010/0208828 | A1 | 8/2010 | Lu et al. |
| 2011/0007803 | A1 | 1/2011 | Karczewicz et al. |
| 2011/0013889 | A1 | 1/2011 | Wu et al. |
| 2012/0250765 | A1 * | 10/2012 | Wu et al. ............ 375/240.12 |
| 2012/0250773 | A1 | 10/2012 | Chien et al. |
| 2013/0235933 | A1 * | 9/2013 | Sasai et al. ............ 375/240.12 |

OTHER PUBLICATIONS

Shen et al., "Buffer Requirement Analysis and Reference Picture Marking for Temporal Scalable Video Coding," Packet Video 2007, Nov. 12-13, 2007, pp. 91-97.
Pan et al, "Fast Algorithms for Inter-view Prediction of Multiview Video Coding," Journal of Multimedia, vol. 6, No. 2, pp. 191-201, Apr. 2011.
International Preliminary Report on Patentability—PCT/US2011/064225, The International Bureau of WIPO—Geneva, Switzerland, Jun. 3, 2013, 8 pp.
Second Written Opinion of international application No. PCT/US2011/064225, dated Mar. 14, 2013, 7 pp.
Bross et al., "High efficiency video coding (HEVC) text specification draft 6," Joint Collaborative Team on Video Coding, JCTVC-H1003, Nov. 21-30, 2011, 259 pp.
Bross et al., "High efficiency video coding (HEVC) text specification draft 7," Joint Collaborative Team on Video Coding, JCTVC-I1003_D2, Apr. 27-May 7, 2012, 290 pp.
Bross et al., "High efficiency video coding (HEVC) text specification draft 8," Joint Collaborative Team on Video Coding, JCTVC-J1003_D7, Jul. 11-20, 2012, 261 pp.
Bross et al., "WD4: Working Draft 4 of High-Efficiency Video Coding," Joint Collaborative Team on Video Coding, JCTVC-F803_d2, Jul. 14-22, 2011, 226 pp.
Bross et al., "WD5: Working Draft 5 of High-Efficiency Video Coding," Joint Collaborative Team on Video Coding, JCTVC-G1103_d2, Nov. 21-30, 2011, 214 pp.
Chen et al, "Comments on Generalized P and B Pictures", Joint Collaborative Team on Video Coding, JCTVC-D401, Jan. 20-28, 2011, 4 pp.
Hsu et al., "Unified Syntax of Reference Picture List Reordering", Joint Collaborative Team on Video Coding, JCTVC-E053, Mar. 16-23, 2011, 4 pp.
International Search Report and Written Opinion—PCT/US2011/064225—ISA/EPO—Jun. 1, 2012—13 pp.
International Telecommunication Union, "Advanced video coding for generic audiovisual services," Standardization Sector of ITU, Jun. 2011, 674 pp.
Sullivan et al: "report of the 4th JCT-VC meeting", Joint Collaborative Team on Video Coding, JCTVC-D_Notes_d3, Jan. 20-28, 2011, 113 pp.
Leontaris et al., "Weighted prediction methods for improved motion compensation", IEEE International Conference on Image Processing, Nov. 2009, 4 pp.
Suzuki et al., "Extension of uni-prediction simplification in B slices", Joint Collaborative Team on Video Coding, JCTVC-D421, Jan. 20-28, 2011, 7 pp.
Suzuki et al., "Extension of uni-prediction simplification in B slices ", Joint Collaborative Team on Video Coding, Jan. 20-28, 2011, 8 pp.
Wiegand et al.,"WD1: Working Draft 1 of High-Efficiency Video Coding", Joint Collaborative Team on Video Coding, JCTVC-C403, Oct. 7-15, 2010, 137 pp.
Wang et al., "On reference picture list construction for uni-predicted partitions" Joint Collaborative Team on Video Coding, JCTVC-E348, Mar. 16-23, 2011, 6 pp.
Wiegand et al., "WD3: Working Draft 3 of High-Efficiency Video Coding," Joint Collaborative Team on Video Coding, JCTVC-E603, Mar. 16-23, 2011,193 pp.
Wiegand et al., "WD2: Working Draft 2 of High-Efficiency Video Coding", Joint Collaborative Team on Video Coding, JCTVC-D503, Jan. 20-28, 2011, 153 pp.
Chien et al., "Modified Uni-directional Inter Prediction in Generalized P and B Picture," Document JCTVC-C285, WG11 No. m18328, 3rd Meeting: Guangzhou, CN, Oct. 7-15, 2010, 2 pp.
Co-pending U.S. Appl. No. 13/361,634, filed Jan. 30, 2012.

* cited by examiner

US 9,008,176 B2

COMBINED REFERENCE PICTURE LIST CONSTRUCTION FOR VIDEO CODING

This application claims the benefit of U.S. Provisional Application No. 61/435,271, filed Jan. 22, 2011, U.S. Provisional Application No. 61/435,281, filed Jan. 22, 2011, U.S. Provisional Application No. 61/450,545, filed Mar. 8, 2011, and U.S. Provisional Application No. 61/490,557, filed May 26, 2011, each of which is hereby incorporated by reference in its respective entirety.

TECHNICAL FIELD

This disclosure relates to video coding and, more particularly, video inter-coding techniques.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), or the emerging High Efficiency Video Coding (HEVC) standard, and extensions of such standards, to transmit and receive digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture may be encoded using spatial prediction with respect to neighboring blocks in the same picture. Video blocks in an inter-coded (P or B) slice of a picture may be encoded using temporal prediction with respect to reference blocks in other reference pictures. Pictures may be referred to as frames, and reference pictures may be referred to a reference frames. Such terms are used interchangeably in this disclosure. Video coding devices store lists of reference pictures in memory for use during inter-coding. The list of reference pictures with display times before the currently coded frame is referred to as List 0, while the list of reference pictures with display times after the current coded frame is referred to as List 1.

SUMMARY

In general, this disclosure relates to techniques for constructing a combined reference picture list, List C, based on List 0 and List 1, used for uni-directional inter-prediction (uni-prediction) of video blocks in any direction, forward or backward. The techniques include coding one or more syntax elements defined to indicate construction information for List C in a picture or slice level, e.g., slice header of a slice, and performing reference picture list construction for List C from List 0 and List 1 based on the syntax elements. Each coded video block of the B slice may have an associated syntax element, i.e., inter_pred_idc, to indicate whether the video block is bi-predicted from List 0 and List 1 (Bi) or uni-directional predicted from List C (Pred_LC). The techniques reduce a cost of coding inter-prediction status for video blocks in B slices because only two inter-prediction statuses for a video block in a B slice are possible, Bi and Pred_LC, which consumes one bit.

In one example, the disclosure is directed toward a method of coding video data comprising constructing a first reference picture list and a second reference picture list from a memory storing decoded reference pictures, constructing a combined reference picture list including one or more reference pictures from at least one of the first reference picture list and the second reference picture list, coding one or more syntax elements indicating construction information for the combined reference picture list, and coding one or more video blocks using uni-directional prediction with respect to one or more reference pictures in the combined reference picture list. For example, the syntax elements may indicate that the combined reference picture list is used for uni-directional prediction, indicate a number of the reference pictures identified in the combined reference picture list, and indicate each entry in the combined reference picture list.

In another example, the disclosure is directed toward a video coding device comprising a memory that stores decoded reference pictures, and a processor configured to construct a first reference picture list and a second reference picture list from the memory, construct a combined reference picture list including one or more reference pictures from at least one of the first reference picture list and the second reference picture list, code one or more syntax elements indicating construction information for the combined reference picture list, and code one or more video blocks using uni-directional prediction with respect to one or more reference pictures in the combined reference picture list.

In a further example, the disclosure is directed toward a video coding device comprising means for constructing a first reference picture list and a second reference picture list from a memory storing decoded reference pictures, means for constructing a combined reference picture list including one or more reference pictures from at least one of the first reference picture list and the second reference picture list, means for coding one or more syntax elements indicating construction information for the combined reference picture list, and means for coding one or more video blocks using uni-directional prediction with respect to one or more reference pictures in the combined reference picture list.

In another example, the disclosure is directed toward a computer-readable storage medium comprising instructions for coding video data that, upon execution in a processor, cause the processor to construct a first reference picture list and a second reference picture list from a memory storing decoded reference pictures, construct a combined reference picture list including one or more reference pictures from at least one of the first reference picture list and the second reference picture list, code one or more syntax elements indicating construction information for the combined reference picture list, and code one or more video blocks using uni-directional prediction with respect to one or more reference pictures in the combined reference picture list.

The details of one or more examples are set forth in the accompanying drawings and the description below. Other features, objects, and advantages will be apparent from the description and drawings, and from the claims.

DETAILED DESCRIPTION

Figure 1:
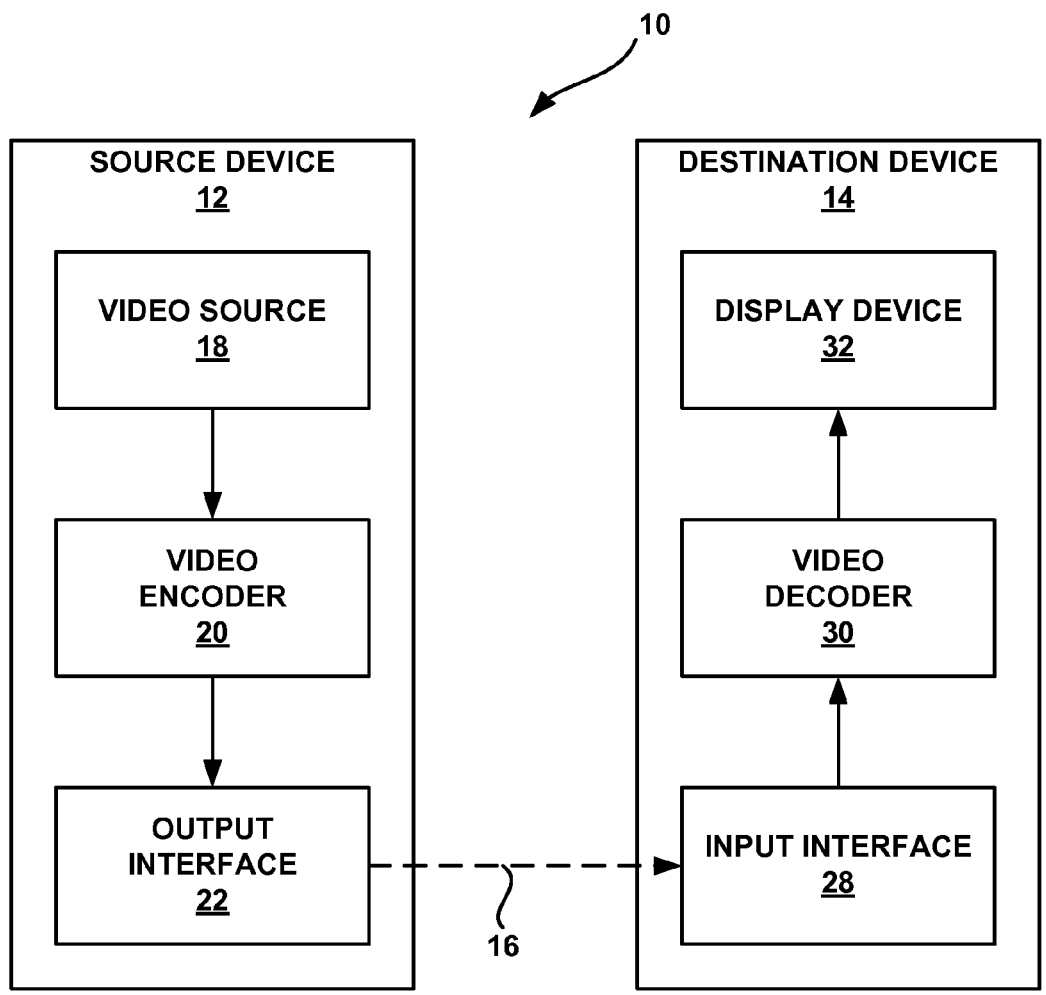
FIG. 1 is a block diagram illustrating an example video encoding and decoding system that may utilize techniques for constructing a combined reference picture list, List C, and efficiently coding uni-directional predicted video blocks using List C.

This disclosure relates to techniques for constructing a combined reference picture list, List C, based on List 0 and List 1, used for uni-directional inter-prediction (uni-prediction) of video blocks in any direction, forward or backward. The techniques include coding one or more syntax elements defined to indicate construction information for List C in a picture or slice level, e.g., slice header of a slice, and performing reference picture list construction for List C from List 0 and List 1 based on the syntax elements. Each coded video block of the B slice may then have an associated syntax element, i.e., inter_pred_idc, to indicate whether the video block is bi-predicted from List 0 and List 1 (Bi) or uni-directional predicted from List C (Pred_LC). When the reference pictures from List 0 and List 1 are combined into List C for uni-directional prediction, only two inter-prediction statuses for a video block in a B slice are possible, Bi and Pred_LC, which consumes one bit. The techniques, therefore, result in reducing a cost of coding inter-prediction status for video blocks in B slices.

Conventionally, video blocks in a P slice may be encoded using uni-directional prediction with a single motion vector pointing to a past reference picture in List 0. Video blocks in a B slice may be encoded using (a) uni-directional prediction with a single motion vector pointing to a past reference picture in List 0, (b) uni-directional prediction with a single motion vector pointing to a future reference picture in List 1, (c) or bi-prediction with two motion vectors pointing to past and future reference pictures in List 0 and List 1, respectively. The P and B slice classifications have since been expanded to include a generalized P/B (GPB) slice in which video blocks are encoded as a B slice, except List 0 and List 1 may include reference pictures in the same temporal direction or different temporal directions. In one specific example of a GPB slice, List 0 and List 1 may be identical.

Syntax elements defined to indicate construction information for the reference picture lists are encoded and signaled to a decoding device in a slice header of a coded video slice. Upon receipt of the coded video slice and its associated syntax elements, the decoder performs reference picture list construction for List 0 and List 1 based on the syntax elements. For a B slice, each coded video block may have an associated syntax element, i.e., inter_pred_idc, to indicate whether the video block is bi-predicted (Bi), uni-directional predicted in the forward direction from List 0 (Pred_L0), or uni-directional predicted in the backward direction from List 1 (Pred_L1). The inter_pred_idc syntax element for a B slice, therefore, consumes two bits to indicate one of the three statuses: Bi, Pred_L0, or Pred_L1.

In the case of a GPB slice when List 0 and List 1 are identical, only two inter-prediction statuses for a video block in the GPB slice are possible, Bi and Pred_L0. In this case, signaling all three statuses using the inter_pred_idc syntax element is inefficient. Instead, the inter_pred_idc syntax element may be modified based on whether a B slice is a normal B slice requiring indication of one of three statuses, which consumes two bits, or a GPB slice requiring indication of only two statuses, Bi and Pred_L0, which only consumes one bit. Signaling only one bit for each video block in a B slice may provide significant gains in signaling efficiency.

The techniques of this disclosure extend the efficiency gains to all B slices, including GPB slices regardless of whether the reference picture lists are identical. The techniques include constructing a combined reference picture list, List C, including one or more reference pictures from at least one of List 0 and List 1. List C is then used for uni-directional prediction of video blocks in B slices. In this way, it is only necessary to signal two statuses, Bi and Pred_LC, which consumes one bit, for each video block in all B slices.

Certain issues may arise when constructing List C at a video decoder. For example, a video encoder may not select each and every reference picture from both List 0 and List 1 to be included in List C. When the video decoder does not know the number of reference pictures included in List C, the video decoder may be unable to construct List C and unable to parse the inter-prediction status syntax elements associated with each video block in the coded B slice. In addition, automatically constructing List C at the video decoder may require complicated decoding processes. According to the techniques, the one or more syntax elements associated with a B slice may indicate that List C is used for uni-directional prediction, and also indicate a number of reference pictures identified in List C and a reference index of a reference picture for each entry in List C.

FIG. 1 is a block diagram illustrating an example video encoding and decoding system 10 that may utilize techniques for constructing a combined reference picture list and efficiently coding uni-directional predicted video blocks using the combined reference picture list. In general, a reference picture list may be alternatively referred to as a reference frame list. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, link 16 may correspond to a storage medium that may store the encoded video data generated by source device 12 and that destination device 14 may access as desired via disk access or card access. The storage medium may include any of a variety of locally accessed data storage media such as Blu-ray discs, DVDs, CD-ROMs, flash memory, or any other suitable digital storage media for storing encoded video data. In a further example, link 16 may correspond to a file server or another intermediate storage device that may hold the encoded video generated by source device 12 and that destination device 14 may access as desired via streaming or download. The file server may be any type of server capable of storing encoded video data and transmitting that encoded video data to the destination device 14 Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the file server may be a streaming transmission, a download transmission, or a combination of both.

The techniques of this disclosure for constructing a combined reference picture list, and efficiently coding uni-directional predicted video blocks using the combined reference picture list, are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 12. The encoded video data may be transmitted directly to destination device 14 via output interface 22 of source device 20. The encoded video data may also be stored onto a storage medium or a file server for later access by destination device 14 for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on a data storage medium, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In accordance with this disclosure, video encoder 20 of source device 12 may be configured to perform techniques for encoding syntax elements indicating construction information for a combined reference picture list, List C, used for uni-directional prediction of video blocks of a B slice in any direction, forward or backward. Video encoder 20 may select one or more reference pictures from at least one of a first reference picture list, List 0, and a second reference picture list, List 1, to be included in List C. Video encoder 20 may then encode one or more syntax elements, e.g., in a slice header of a B slice, defined to indicate that List C is used for uni-directional prediction. Video encoder 20 may further encode syntax elements defined to explicitly signal, in the encoded video data, the manner in which the contents of List C should be constructed from List 0 and List 1 by video decoder 30, including a number of reference pictures identified in List C and a reference index of a reference picture from List 0 or List 1 for each entry in List C.

According to the techniques, video blocks in a B slice may be encoded using either uni-directional prediction with a single motion vector pointing to a reference picture in List C, or bi-prediction with two motion vectors pointing to two reference pictures in List 0 and List 1, respectively. The techniques may be applied to all B slices, including GPB slices, such that List 0 and List 1 may include reference pictures in the same temporal direction or different temporal directions. In one specific example, List 0 and List 1 may be identical. Consequently, List C, which includes reference pictures from at least one of List 0 and List 1, may include reference pictures in both forward and backward temporal directions relative to a current picture.

Video encoder 20 also encodes an inter-prediction status syntax element, i.e., inter_pred_idc, associated with each coded video block of the B slice to indicate whether the video block is bi-predicted from List 0 and List 1 (Bi) or uni-directional predicted from List C (Pred_LC). When the reference pictures from List 0 and List 1 are combined into List C for uni-directional prediction, only two inter-prediction statuses for a video block in a B slice are possible, Bi and Pred_LC. The techniques, therefore, result in reducing a cost of coding inter-prediction status for video blocks in B slices, including GPB slices regardless of whether List 0 and List 1 are identical.

In accordance with this disclosure, video decoder 30 of destination device 14 may be configured to perform techniques for constructing a combined reference picture list, List C, to include one or more reference pictures from at least one of a first reference picture list, List 0, and a second reference picture list, List 1, used to decode video blocks that are uni-directional predicted in any direction, forward or backward. Video decoder 30 may receive an encoded bitstream representing encoded video blocks in a B slice and associated syntax elements. The techniques generally include constructing List 0 and List 1, decoding one or more of the syntax elements in a slice header of the B slice defined to indicate construction information for List C, and performing reference picture list construction for List C based on the syntax elements.

More specifically, according to the techniques, video decoder 30 decodes one or more of the syntax elements in the slice header of the B slice defined to indicate whether List C is used for uni-directional prediction. When List C is used for uni-directional prediction, video decoder 30 may further decode one or more syntax elements defined to explicitly signal the manner in which the contents of List C should be constructed from List 0 and List 1 by video decoder 30, including a number of reference pictures identified in List C, and a reference index of a reference picture from List 0 or List 1 for each entry in List C. Video decoder 30 may then construct List C including reference pictures from at least one of List 0 and List 1 using the syntax elements.

Video decoder 30 may also decode an inter-prediction status syntax element, i.e., inter_pred_idc, associated with each encoded video block of the B slice to determine whether the video block is bi-predicted from List 0 and List 1 (Bi) or uni-directional predicted from List C (Pred_LC). When the inter-prediction status is Bi, video decoder 30 may decode the video block using bi-prediction with two motion vectors pointing to reference pictures in List 0 and List 1, respectively. When the inter-prediction status is Pred_LC, video decoder 30 may decode the video block using uni-directional prediction with a single motion vector pointing to a reference picture in List C. As described above, the B slice may be either a normal B slice or a GPB slice. In either case, according to the techniques, the inter-prediction status syntax element has only two statuses, i.e., uni-directional prediction from List C or bi-prediction from List 0 and List 1, and, therefore, is only consumes one bit.

The techniques include explicitly signaling the number of reference pictures included in List C, because List C may not necessarily include each and every reference picture from both List 0 and List 1. If video decoder 30 does not know the number of reference pictures included in List C, video decoder 30 may be unable to construct List C and unable to parse the inter-prediction status syntax elements associated with each video block in the coded B slice. In addition, automatically constructing List C at video decoder 30, i.e., without explicit signaling, may require complicated decoding processes.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU must be square in shape.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Figure 2:
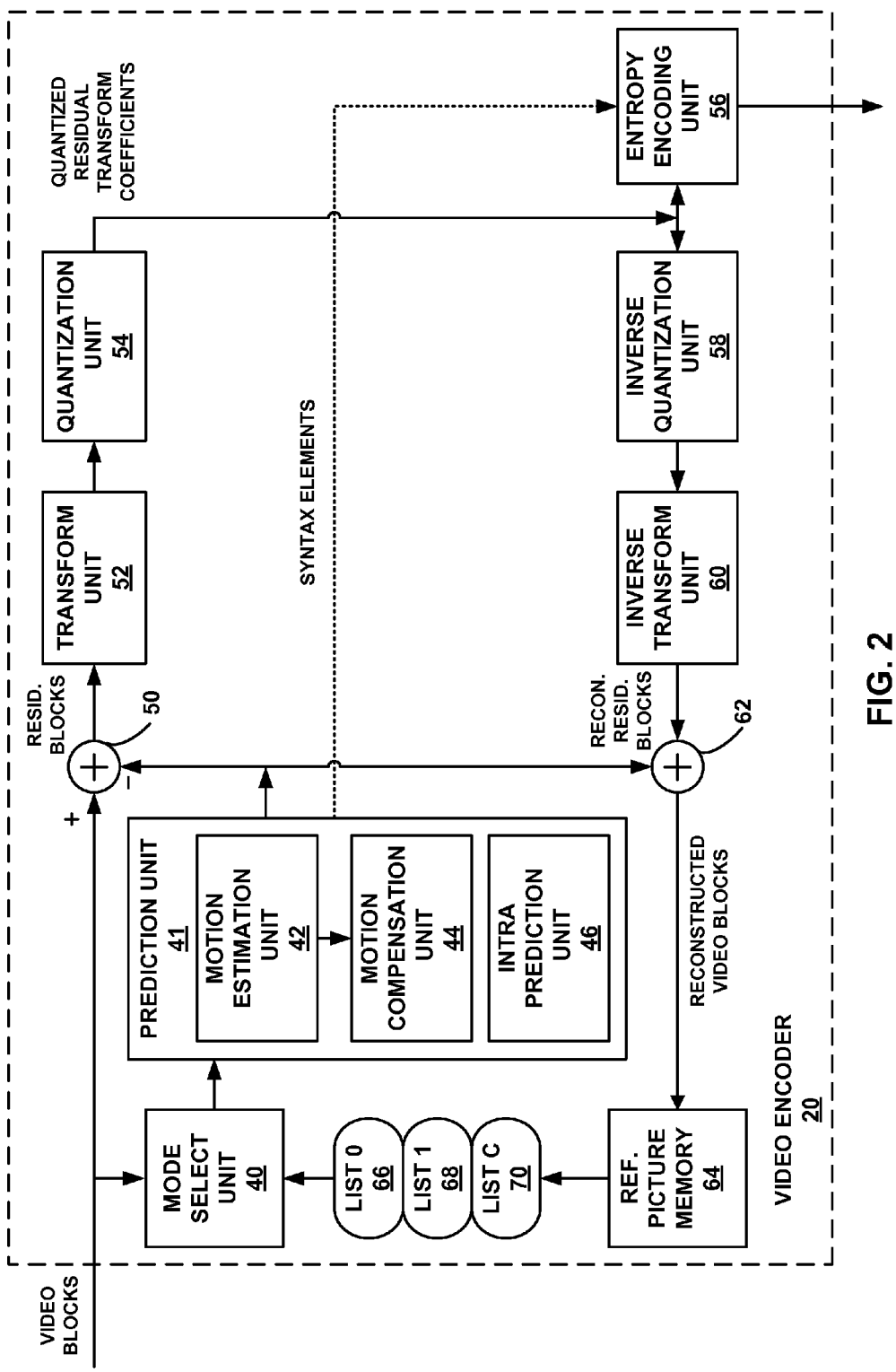
FIG. 2 is a block diagram illustrating an example video encoder that may implement techniques for encoding syntax elements indicating construction information for List C and encoding uni-directional predicted video blocks using List C.

FIG. 2 is a block diagram illustrating an example video encoder 20 that may implement techniques for encoding syntax elements indicating construction information for a combined reference picture list, List C 70, and encoding unidirectional predicted video blocks using List C 70. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as unidirectional prediction (P mode) or bi-prediction (B mode), may refer to any of several temporal-based compression modes.

In the example of FIG. 2, video encoder 20 includes mode select unit 40, prediction unit 41, reference picture memory 64, summer 50, transform unit 52, quantization unit 54, and entropy encoding unit 56. Prediction unit 41 includes motion estimation unit 42, motion compensation unit 44, and intra prediction unit 46. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

As shown in FIG. 2, video encoder 20 receives a current video block within a video slice to be encoded. The slice may be divided into multiple video blocks. Mode select unit 40 may select one of the coding modes, intra or inter, for the current video block based on error results, and prediction unit 41 may provide the resulting intra- or inter-coded block to summer 50 to generate residual block data and to summer 62 to reconstruct the encoded block for use as a reference picture.

Intra prediction unit 46 within prediction unit 41 may perform intra-predictive coding of the current video block relative to one or more neighboring blocks in the same frame or slice as the current block to be coded to provide spatial compression. Motion estimation unit 42 and motion compensation unit 44 within prediction unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) 66 or a second reference picture list (List 1) 68, or, according to techniques of this disclosure, from a combined reference picture list (List C) 70. List 0 66 and List 1 68 may be constructed based on decoded reference pictures stored in reference picture memory 64. List C 70 may be constructed to include reference pictures identified in at least one of List 0 66 and List 1 68. In general, the reference picture lists may be alternatively referred to as reference frame lists.

As an example, when the inter-coded slice comprises a P slice, motion estimation unit 42 may uni-directional predict a video block of the P slice with a single motion vector pointing to a reference picture in List 0 66 that includes identifiers for past reference pictures. In accordance with the techniques of this disclosure, when the inter-coded slice comprises a B slice, motion estimation unit 42 may either bi-predict a video block of the B slice with two motion vectors pointing to a reference picture in List 0 66 and List 1 68, or uni-directional predict a video block of the B slice with a single motion vector pointing to a reference picture in List C 70.

For a normal B slice, List 0 66 may include identifiers for past reference pictures and List 1 68 may include identifiers for future reference pictures, i.e., in display order, which may be indicated by a picture order count (POC) value associated with each picture. When the B slice comprises a GPB slice, both List 0 66 and List 1 68 may include reference pictures in the same temporal direction. In one specific example of a GPB slice, List 0 and List 1 may be identical. In that case, both List 0 66 and List 1 68 have the same number of pictures (denoted as N), and any picture with reference index i (i<N) in List 0 66 is the same as the picture with reference index i in List 1 68. Consequently, List C 70, which includes reference pictures from at least one of List 0 66 and List 1 68, may include reference pictures in both forward and backward temporal directions relative to a current picture.

Motion estimation unit 42 sends the calculated motion vector to entropy encoding unit 56 and motion compensation unit 44. Motion compensation, performed by motion compensation unit 44, may involve fetching or generating the predictive block based on the motion vector determined by motion estimation. Upon receiving the motion vector for the PU of the current video block, motion compensation unit 44 may locate the predictive block to which the motion vector points in one of List 0 66, List 1 68, or List C 70. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation.

Motion compensation unit 44 may also generate syntax elements associated with the video blocks and the video slice for use by video decoder 30 in decoding the video blocks of the video slice. For example, motion compensation unit 44 may generate syntax elements defined to indicate construction information for List 0 66, List 1 68, and List C 70 at a video slice level. Video decoder 30 may use these syntax elements to first construct a List 0 and a List 1, and then construct a combined reference picture list to include one or more reference pictures from the List 0 and the List 1. Video decoder 30 may then decode the original video blocks with respect to one or more reference pictures in the reference picture lists.

In addition, motion compensation unit 44 may generate inter-prediction status syntax elements, i.e., inter_pred_idc, associated with each coded video block of the video slice to indicate whether the video block is bi-predicted from List 0 66 and List 1 68 (Bi) or uni-directional predicted from List C 70 (Pred_LC). When the reference pictures from List 0 66 and List 1 68 are combined into List C 70 for uni-directional prediction, only two inter-prediction statuses for a video block in a B slice are possible, Bi and Pred_LC, which consumes one bit. The techniques, therefore, result in reducing a cost of coding inter-prediction status for video blocks in B slices, including GPB slices regardless of whether List 0 and List 1 are identical.

Certain issues may arise, however, when constructing the combined reference picture list at video decoder 30 to decode the video blocks in a B slice. For example, video decoder 30 may not have selected each and every reference picture from both List 0 66 and List 1 68 to be included in List C 70. When video decoder 30 does not know the number of reference pictures included in List C 70, video decoder 30 may be unable to construct the combined reference picture list and unable to parse the inter-prediction status syntax elements associated with each video block in the coded B slice. In addition, automatically constructing the combined reference picture list at video decoder 30 may require complicated decoding processes. According to example techniques described in this disclosure, when List C 70 is used for uni-directional prediction of a B slice, video encoder 20 encodes one or more syntax elements to explicitly signal, in the encoded video data, the manner in which the contents of List C 70 should be constructed from List 0 66 and List 1 68 by video decoder 30. Specifically, the syntax elements may indicate a number of reference pictures in List C 70 and an index of a reference picture from List 0 66 or List 1 68 for each entry of List C 70.

In one example, video encoder 20 may select all the reference pictures in both List 0 66 and List 1 68 to be included in List C 70. In this case, the number of reference pictures in List C 70 may be equal to the sum of the number of reference pictures in List 0 66 and List 1 68. In other cases, however, video encoder 20 may be configured to construct List C 70 in a flexible manner such that the number of reference pictures in List C 70 may be less than the total number of reference pictures in List 0 66 and List 1 68, and not be known to video decoder 30.

In some cases, there may be partial overlap between the one or more reference pictures in List 0 66 and List 1 68. In particular, List 0 66 and List 1 68 may contain some reference pictures that are different in each list and some reference pictures that are the same in each list, such that some of the reference pictures may appear in both List 0 66 and List 1 68. In some implementations, video encoder 20 may be designed to avoid duplication of reference pictures in List C. For example, when List C 70 is constructed to eliminate redundant reference pictures, the number of reference pictures in List C 70 may be less than the sum of the numbers of reference pictures in List 0 66 and List 1 68. In other examples, video encoder 20 may be configured to select less than all of the reference pictures in List 0 66 and List 1 68 to be included in List C 70. Accordingly, when the pictures of List 0 66 and List 1 68 are added to List C 70, the number of reference pictures in List C 70 may be uncertain due to the addition of reference pictures that are in one list but not the other and/or the optional elimination of redundant reference pictures that are in both lists.

To permit video decoder 30 to construct the combined reference picture list, in accordance with examples of this disclosure, video encoder 20 may be configured to explicitly signal the number of reference pictures in List C 70 and each entry in List C 70 in the slice header of B slice. Video encoder 20 may signal construction information for List C 70, for example, after signaling reference picture list modification syntax tables for List 0 66 and List 1 68 in the slice header of the B slice. Alternatively, video encoder 20 may signal construction information for List C 70 before signaling reference picture list modification syntax tables in the slice header. An example slice header including a combined reference picture list syntax table, i.e., ref_pic_list_combination, and reference picture list modification or reordering syntax tables, i.e., ref_pic_list modification, and other slice header syntax elements is provided below in Table 1, and described in more detail with respect to FIG. 3.

In addition, video encoder 20 may explicitly signal other syntax elements for use by video decoder 30 in constructing the combined reference picture list. For example, the combined reference picture list syntax table indicates whether List C 70 is used for uni-directional prediction of video blocks in a B slice. When List C 70 is used for uni-directional prediction, video encoder 20 signals a one-bit flag, i.e., ref_pic_list_combination_flag, to indicate whether List C 70 is constructed from List 0 66 and List 1 68 or merely set equal to one of the reference picture lists. For example, in the case where List 0 66 and List 1 68 are identical, i.e., the B slice is a GPB slice, video encoder 20 may set List C 70 equal to List 0 66 or List 1 68. In this case, video encoder 20 does not encode additional syntax elements to explicitly signal the manner in which the contents of List C 70 should be constructed from List 0 66 and List 1 68 to video decoder 30. Instead, the number of the reference pictures in List C 70 may be indicated based on the number of reference pictures included in either of List 0 66 or List 1 68.

When List C 70 is constructed from List 0 66 and List 1 68, the combined reference picture list syntax table includes a syntax element that explicitly signals the number of reference pictures in List C 70, i.e., num_com_ref_list_active_minus1. As an alternative, video encoder 20 may be configured to signal the number of overlapping reference pictures in List 0 66 and List 1 68, i.e., the number of pictures that are the same in List 0 66 and List 1 68. The combined reference picture list syntax table, for example, may include a syntax element, i.e., num_overlapped_pics, that explicitly signals the number of overlapping reference pictures. In other examples, this syntax element may be explicitly signaled in the slice header. In this alternative case, video decoder 30 may determine the number of reference pictures in List C 70 based on the indicated number of reference pictures in List 0 66, i.e., num_ref_idx_l0_active_minus1, the indicated number of reference pictures in List 1, i.e., num_ref_idx_l1_active_minus1, and the indicated number of overlapping reference pictures. In particular, video decoder 30 may calculate the number of reference pictures in List C 70 as: num_ref_idx_l0_active_minus1+num_ref_idx_l1_active_minus1+2-num_overlapped_pics.

When List C 70 is constructed from List 0 66 and List 1 68, the combined reference picture list syntax table prepared by encoder 20 for use by decoder 30 also includes syntax elements that explicitly signal each entry in List C 70, including a current reference picture list, either List 0 66 or List 1 68, and a reference index of a reference picture in the current list. More specifically, video encoder 20 may signal a one-bit flag, i.e., pic_from_list_0_flag(i), where i identifies the entry in List C 70, that indicates the current reference picture list of the reference picture in the entry in List C 70. Video encoder 20 also may signal a syntax element, i.e., ref_idx_list_curr(i), where identifies the entry in List C 70, that indicates the index of the reference picture in the current reference picture list.

In some cases, bit consumption for signaling List C 70 may be reduced using at least two approaches, which may be used alone or together in different implementations. First, video encoder 20 may be configured to signal a two-bit flag, i.e., com_list_equal_idc, to indicate whether List C 70 is explicitly signaled or equal to one of List 0 66 and List 1 68. For example, when one of List 0 66 and List 1 68 is a subset of the other list, video encoder 20 sets List C 70 equal to the other list. In this case, List C 70 includes all of the reference pictures of the larger one of List 0 66 and List 1 68, which inherently includes all of the pictures from the smaller list that forms the subset. If List C 70 is equal to either List 0 66 or List 1 68, video encoder 20 does not need to encode any additional syntax elements to explicitly signal the manner in which the contents of List C 70 should be constructed from List 0 66 and List 1 68 by video decoder 30. Instead, the number of the reference pictures in List C 70 may be indicated based on the number of reference pictures included in either of List 0 66 or List 1 68.

Second, video encoder 20 may be configured to differentially signal an index of a reference picture for each entry in List C 70. In this case, instead of encoding the actual index value of a reference picture in List C 70, video encoder 20 encodes an index delta, i.e., delta_ref_idx_list_curr_minus1, for the reference picture to indicate a difference (e.g., an offset) between an index of the reference picture in the current reference picture list and an index of a previous reference picture in the same reference picture list that was added to a previous entry in List C 70. The index values of reference pictures included in List C 70 from a given one of List 0 66 and List 1 68 are typically in increasing order and increase by small increments.

In this case, video decoder 30 may determine the index of the reference picture in the current reference picture list based on the indicated index delta, i.e., delta_ref_idx_list_curr_minus1, and the previously indicated index of the previous reference picture from the current reference picture list, i.e., PreRefIdxLx, where x indicates the current reference picture list. In particular, video decoder 30 may calculate the index of the current reference picture in List C 70, i.e., CurrRef_Idx_Lx, as: delta_ref_idx_list_curr_minus1+1+PreRefIdxLx. Examples of the combined reference picture list syntax table, i.e., ref_pic_list_combination, are provided below in Table 2 and Table 3, described in more detail with respect to FIG. 3.

After motion compensation unit 44 generates the predictive block for the current video block, video encoder 20 forms a residual video block by subtracting the predictive block from the current video block. The residual video data in the residual block may be included in one or more TUs and applied to transform unit 52. Transform unit 52 transforms the residual video data into residual transform coefficients using a transform, such as a discrete cosine transform (DCT) or a conceptually similar transform. Transform unit 52 may convert the residual video data from a pixel domain to a transform domain, such as a frequency domain.

Transform unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), or another entropy encoding technique. Following the entropy encoding by entropy encoding unit 56, the encoded bitstream may be transmitted to video decoder 30, or archived for later transmission or retrieval by video decoder 30.

Entropy encoding unit 56 may also entropy encode the motion vectors and the other syntax elements for the current video slice being coded. For example, entropy encoding unit 56 may entropy encode the syntax elements defined to indicate construction information for List 0 66, List 1 68, and List C 70 at a video slice level. According to the techniques, entropy encoding unit 56 may entropy encode the syntax elements that explicitly signal the manner in which the contents of List C 70 should be constructed from List 0 66 and List 1 68 by video decoder 30. In addition, entropy encoding unit 56 may entropy encode the inter-prediction status syntax elements, i.e., inter_pred_idc, associated with each coded video block of the video slice to indicate whether the video block is bi-predicted from List 0 66 and List 1 68 (Bi) or uni-directional predicted from List C 70 (Pred_LC). Video decoder 30 may use these syntax elements to construct the reference picture lists and reconstruct the original video blocks encoded by video encoder 20.

Inverse quantization unit 58 and inverse transform unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within List 0 66 or List 1 68. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Figure 3:
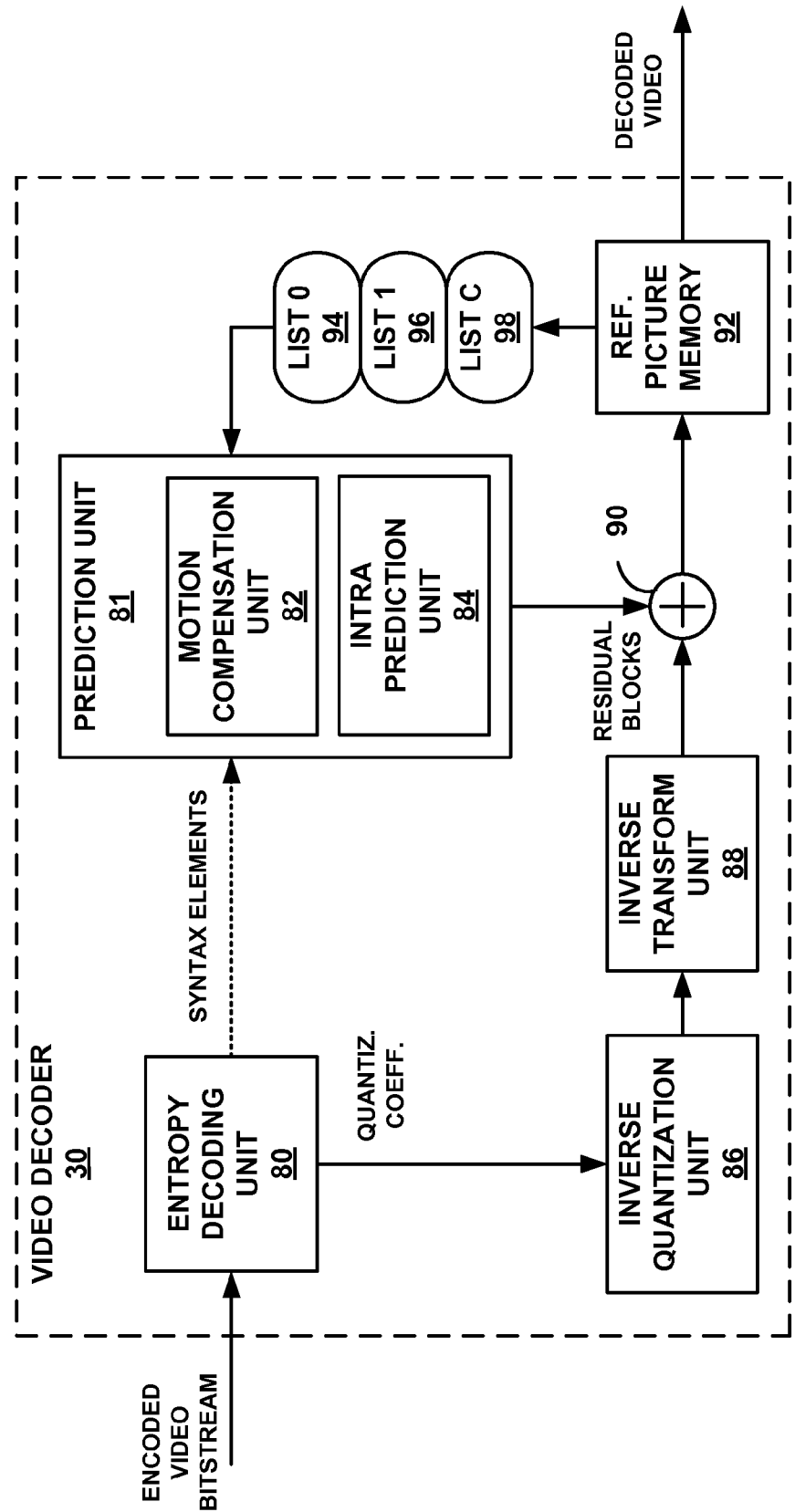
FIG. 3 is a block diagram illustrating an example video decoder that may implement techniques for constructing List C using syntax elements and decoding uni-directional predicted video blocks using List C.

FIG. 3 is a block diagram illustrating an example video decoder 30 that may implement techniques for constructing a combined reference picture list, List C 98, using syntax elements and decoding uni-directional predicted video blocks using List C 98. In the example of FIG. 3, video decoder 30 includes an entropy decoding unit 80, prediction unit 81, inverse quantization unit 86, inverse transformation unit 88, summer 90, and reference picture memory 92. Prediction unit 81 includes motion compensation unit 82 and intra prediction unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction unit 81. Video decoder 30 may receive the syntax elements at the video slice level and/or the video block level.

When the video slice is coded as an intra-coded (I) slice, intra prediction unit 84 of prediction unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction unit 81 produces predictive blocks for a video block of the current video slice based on the motion vectors and other syntax elements received from entropy decoding unit 80.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. Motion compensation unit 82 may determine the interpolation filters used by video encoder 20 from the received syntax elements and use the interpolation filters to produce predictive blocks.

The predictive blocks may be produced from a first reference picture list (List 0) 94, a second reference picture list (List 1) 96, or, according to techniques of this disclosure, a combined reference picture list (List C) 98. As an example, when the inter-coded slice comprises a P slice, motion compensation unit 82 produces predictive blocks for uni-directional predicted video blocks of the P slice based on a single motion vector pointing to a reference picture in List 0 94 that includes identifiers for past reference pictures. In accordance with the techniques of this disclosure, when the inter-coded slice comprises a B slice, motion compensation unit 82 may produce predictive blocks for either bi-predicted video blocks of the B slice based on two motion vectors pointing to reference pictures in List 0 94 and List 1 96, or uni-directional predicted video blocks of the B slice based on a single motion vector pointing to a reference picture in List C 70.

Video decoder 30 may construct List 0 94 and List 1 96 using default construction techniques based on reference pictures stored in reference picture memory 92. In order to construct List 0 94 and List 1 96, video decoder 30 performs reference picture list initialization and reference picture list modification (i.e., reordering) for each of List 0 94 and List 1 96. To construct List 0 94, e.g., video decoder 30 may perform reference picture list initialization by adding reference pictures from reference picture memory 92 to List 0 94 according to a predetermined order. For example, video decoder 30 may initialize List 0 94 based on the order of frame numbers, i.e., decoding order, of the reference pictures, or based on the order of Picture Order Count (POC) numbers, i.e., display order, of the reference pictures. Video decoder 30 may then perform reference picture list modification to reorder the reference pictures included in List 0 94 based on an explicitly signaled order. After initialization, video decoder 30 may truncate List 0 94 to not exceed the number of active reference pictures to be included in List 0 94. In some cases, video decoder 30 may also apply prediction weights and offsets to reference pictures in List 0 94 based on explicitly signaled weight and offset values.

According to the techniques of this disclosure, video decoder 30 may construct List C 98 to include reference pictures from at least one of List 0 94 and List 1 96 using the syntax elements. For a normal B slice, List 0 94 may include identifiers for past reference pictures and List 1 96 may include identifiers for future reference pictures. When the B slice comprises a GPB slice, both List 0 94 and List 1 96 may include reference pictures in the same temporal direction. In one specific example of a GPB slice, List 0 94 and List 1 96 may be identical. In that case, both List 0 94 and List 1 96 have the same number of pictures (denoted as N), and any picture with reference index i (i<N) in List 0 94 is the same as the picture with reference index i in List 1 96. Consequently, List C 98, which includes reference pictures from at least one of List 0 94 and List 1 96, may include reference pictures in both forward and backward temporal directions relative to a current picture.

Certain issues may arise, however, when constructing the combined reference picture list at video decoder 30 to decode the video blocks in a B slice. For example, List C 98 may not necessarily include each and every reference picture from both List 0 94 and List 1 96. When video decoder 30 does not know the number of reference pictures included in List C 98, video decoder 30 may be unable to construct List C 98 and unable to parse the inter-prediction status syntax elements associated with each video block in the coded B slice. In addition, automatically constructing the combined reference picture list at video decoder 30 may require complicated decoding processes. According to the techniques, when List C 98 is used for uni-directional prediction of a B slice, video decoder 30 receives one or more syntax elements that explicitly signal the manner in which the contents of List C 98 should be constructed from List 0 94 and List 1 96 by video decoder 30. Specifically, the syntax elements may indicate a number of reference pictures in List C 98 and an index of a reference picture for each entry of List C 98.

In order to construct List C 98, video decoder 30 may receive construction information for List C 98, for example, after reference picture list modification or reordering syntax tables for List 0 94 and List 1 96 in the slice header of the B slice. Alternatively, video decoder 30 may receive construction information for List C 98 before signaling of reference picture list modification (reordering) syntax tables in the slice header. An example slice header including a combined reference picture list syntax table, i.e., ref_pic_list_combination, and reference picture list modification or reordering syntax tables, i.e., ref_pic_list modification, and other slice header syntax elements is provided below in Table 1.

TABLE 1

| slice_header( ) { | C | Descriptor |
|---|---|---|
| first_lctb_in_slice | 2 | ue(v) |
| slice_type | 2 | ue(v) |
| pic_parameter_set_id | 2 | ue(v) |
| frame_num | 2 | u(v) |
| if( IdrPicFlag ) | | |
|    idr_pic_id | 2 | ue(v) |
| pic_order_cnt_lsb | 2 | u(v) |
| if( slice_type = = P || slice_type = = B ) { | | |
|    num_ref_idx_active_override_flag | 2 | u(1) |
|    if( num_ref_idx_active_override_flag ) { | | |
|       num_ref_idx_l0_active_minus1 | 2 | ue(v) |
|       if( slice_type = = B ) | | |
|          num_ref_idx_l1_active_minus1 | 2 | ue(v) |
|    } | | |
| } | | |
| ref_pic_list_modification( ) | | |
| ref_pic_list_combination( ) | | |
| if( nal_ref_idc != 0 ) | | |
|    dec_ref_pic_marking( ) | 2 | |
| if( entropy_coding_mode_flag ) { | | |
|    pipe_multi_codeword_flag | 2 | u(1) |
|    if( !pipe_multi_codeword_flag ) |  |  |

TABLE 1-continued

| slice_header( ) { | C | Descriptor |
|---|---|---|
|            pipe_max_delay_shift_6 | 2 | ue(v) |
|     else | | |
|       balanced_cpus | 2 | u(8) |
|       if( slice_type != I ) | | |
|         cabac_init_idc | 2 | ue(v) |
|   } | | |
|   slice_qp_delta | 2 | se(v) |
|   alf_param( ) | | |
|   if( slice_type = = P || slice_type = = B ) { | | |
|     mc_interpolation_idc | 2 | ue(v) |
|     mv_competition_flag | 2 | u(1) |
|     if ( mv_competition_flag ) { | | |
|       mv_competition_temporal_flag | 2 | u(1) |
|     } | | |
|   } | | |
|   if ( slice_type = = B && mv_competition_flag) | | |
|     collocated_from_l0_flag | 2 | u(1) |
|   sifo_param( ) | | |
|   edge_based_prediction_flag | 2 | u(1) |
|   if( edge_prediction_ipd_flag = = 1 ) | | |
|     threshold_edge | 2 | u(8) |
| } | | |

The C column in Table 1, and Table 2 and Table 3 below, indicates a category for each syntax element that defines the data partition of the current video slice in which the syntax element is included. The Descriptor column in Table 1 indicates a type of coding used for the syntax element to enable proper parsing of the syntax element at video decoder 30. For example, the descriptor "ue(v)" indicates exponential-Golomb coding.

In addition, video decoder 30 may receive other syntax elements used to construct List C 98. Table 2 below presents a first example of the combined reference picture list syntax table, i.e., ref_pic_list_combination( ).

TABLE 2

| ref_pic_list_combination( ) { | C | Descriptor |
|---|---|---|
|   if( slice_type % 5 = = 1 ) { // b slice | | |
|     ref_pic_list_combination_flag | 2 | u(1) |
|     if(ref_pic_list_combination_flag ) | | |
|       num_com_ref_list_active_minus1 | 2 | ue(v) |
|       for (i =0; i <= | | |
|       num_com_ref_list_active_minus1; | | |
|       i++) { | | |
|         pic_from_list_0_flag(i) | 2 | u(1) |
|         ref_idx_list_curr(i) | 2 | ue(v) |
|       } | | |
|     } | | |
|   } | | |
| } | | |

The combined reference picture list syntax table first indicates whether List C 98 is used for uni-directional prediction of video blocks in a B slice. When List C 98 is used for uni-directional prediction of a B slice, video decoder 30 receives one or more syntax elements that explicitly signal the manner in which the contents of List C 98 should be constructed from List 0 94 and List 1 96 by video decoder 30. As shown in Table 2, if the current slice type is a B slice, a bit flag, i.e., ref_pic_list_combination_flag, indicates that the List C 98 is to be used for uni-directional prediction of video blocks in the B slice. The value of the ref_pic_list_combination_flag indicates whether List C 98 is to be constructed from List 0 94 and List 1 96 or merely set equal to one of the reference picture lists. More specifically, a value of the ref_pic_list_combination_flag equal to 1 indicates that video decoder 30 will construct List C 98 from List 0 94 and List 1 96.

A value of the ref_pic_list_combination_flag equal to 0 indicates that List 0 94 and List 1 96 are identical, i.e., the B slice is a GPB slice, and video decoder 30 may set List C 98 equal to List 0 94 or List 1 96. In the case where List C 96 is not constructed from List 0 94 and List 1 96, video decoder does not receive additional syntax elements that explicitly signal the manner in which the contents of List C 98 should be constructed from List 0 94 and List 1 96 by video decoder 30. Instead, the number of the reference pictures in List C 98 may be determined based on the number of reference pictures included in either of List 0 94 or List 1 96.

In either case, when the ref_pic_list_combination_flag has a value equal to 0 or 1, video decoder 30 constructs List C 98 to decode uni-directional predicted video blocks in a B slice. As described above, by using List C 98, the inter_pred_idc syntax elements associated with each video block in the B slice can be modified to reduce signaling from three statuses (Bi, Pred_L0, Pred_L1), which consumes two bits, to two statuses (Bi, Pred_LC), which consumes one bit, as in the case of a GPB slice when the reference picture lists are identical. As a result, the techniques may provide significant gains in efficiency for the video blocks in the B slice that are uni-directional predicted with respect to List C 98. Alternatively, a value of the ref_pic_list_combination_flag equal to 0 may simply indicate that a combined list is not used for the current slice.

If the ref_pic_list_combination_flag has a value equal to 1, instead of merely setting List C 98 equal to List 0 94 or List 1 96, video decoder 30 selects reference pictures from List 0 94 and List 1 96 in a manner specified by video encoder 20 to produce List C 98. In particular, with further reference to Table 2 above, if the ref_pic_list_combination_flag has a value equal to 1, i.e., List C 98 is constructed from List 0 94 and List 1 96, video decoder 30 receives the explicitly signaled number of pictures in List C 98, i.e., num_com_ref_list_active_minus1. The num_com_ref_list_active_minus1 syntax element specifies the number of reference pictures in List C 98, which is equal to the overall number of reference pictures selected from List 0 94 and List 1 96 for List C 98. This number may or may not be equivalent to the total number of reference pictures in List 0 94 and List 1 96, depending on the configuration of video encoder 20.

As an alternative, instead of receiving the number of reference picture in List C 98, video decoder 30 may receive the explicitly signaled number of overlapping reference pictures in List 0 94 and List 1 96, i.e., num_overlapped_pics. In this case, video decoder 30 may determine the number of reference pictures in List C 70 based on the indicated number of reference pictures in List 0 94, i.e., num_ref_idx_l0_active_minus1, the indicated number of reference pictures in List 1 96, i.e., num_ref_idx_l1_active_minus1, and the indicated number of overlapping reference pictures. In particular, video decoder 30 may calculate the number of reference pictures in List C 98 as: num_ref_idx_l0_active_minus1+num_ref_idx_l1_active_minus1+2-num_overlapped_pics.

As indicated in Table 2 above, video decoder 30 then enters a loop (from i=0 to i=num_com_ref_list_active_minus1) to construct List C 98 having a number of pictures equal to num_com_ref_list_active_minus1. List C 98 is set to be empty at the start of the construction loop defined by the additional syntax elements in Table 2. In the loop, syntax elements explicitly signal each entry in List C 98, including a current reference picture list, either List 0 94 or List 1 96, and a reference index of a reference picture in the current list.

More specifically, a one-bit flag, i.e., pic_from_list_0_flag (i), where i identifies the entry in List C 98, indicates the current reference picture list of the reference picture to be added to the entry in List C 98. When the value of the pic_from_list_0_flag is equal to 1, the current reference picture to be added to the entry in List C 98 is from List 0 94, and the current reference picture list indicated by the CurrRefPicList syntax element is List 0 94. When the value of the pic_from_list_0_flag is equal to 0, the current reference picture to be added to the entry in List C 98 is from List 1 96, and the current reference picture list indicated by CurrRefPicList is List 1 96. The state of the pic_from_list_0_flag may change according to an array indexed by the value of i, such that the construction loop selectively adds indices for pictures from List 0 94 or List 1 96, e.g., on an alternating basis or in other patterns, into List C 98 as specified by video encoder 20.

With further reference to Table 2 above, a syntax element, i.e., ref_idx_list_curr(i), where i identifies the entry in List C 70, indicates the reference index of the current reference picture in the CurrRefPicList, i.e., List 0 94 or List 1 96 depending on the value of the pic_from_list_0_flag, to be added to the entry in List C 98. Because the value of i increments sequentially from 0 to num_com_ref_list_active_minus1, video decoder 30 appends the indicated reference index of the current reference picture at the end of List C 98. The reference indices in each reference picture list, List 0 94 or List 1 96, may increment sequentially or non-sequentially depending on the configuration of video encoder 20.

With each iteration of the loop, video decoder 30 adds an indicated reference index of another reference picture in the current reference picture list, List 0 94 or List 1 96, to the end of List C 98. Upon completing a number of iterations equal to num_com_ref_list_active_minus1, video decoder 30 has constructed List C 98. Video decoder 30 may then use List C 98 for decoding uni-directional predicted video blocks in a B slice. Video decoder 30 may also accommodate a modified inter-prediction status syntax element that limits B coding to two statuses, Bi and Pred_LC, where Pred_LC represents uni-directional prediction with respect to List C 98.

Table 3 presents a second example of the combined reference picture list syntax table, i.e., ref_pic_list_combination( ) that includes alternative bit reduction approaches. Bit consumption for signaling List C 70 may be reduced using at least two approaches, which may be used alone or together in different implementations.

List 1 96. A value of the ref_pic_list_combination_flag equal to 1 indicates that video decoder 30 will construct List C 98 from List 0 94 and List 1 96.

As a first bit reduction approach, when List C 98 is to be constructed from List 0 94 and List 1 96, video decoder 30 may also receive a twobit flag, i.e., com_list_equal_idc, that indicates whether List C 98 is explicitly signaled, equal to List 0 94, or equal to List 1 96. If the com_list_equal_idc flag has a value equal to 0, List C 98 is explicitly signaled by video encoder 20. If the com_list_equal_idc flag has a value equal to 1, List C 98 is identical to List 0 94. If the com_list_equal_idc flag has a value equal to 2, List C 98 is identical to List 1 96. For example, when one of List 0 94 and List 1 96 is a subset of the other list, video decoder 30 constructs List C 98 by setting List C 98 equal to the other list. In this case, List C 98 includes all of the reference pictures of the larger one of List 0 94 and List 1 96, which inherently includes all of the pictures from the smaller list that forms the subset.

If List C 98 is explicitly signaled, video decoder 30 enters the construction loop to construct List C 98 in the manner described above with respect to Table 2. If List C 98 is equal to either List 0 94 or List 1 96, video decoder 30 does not receive any additional syntax elements that explicitly signal the manner in which the contents of List C 98 should be constructed from List 0 94 and List 1 96 by video decoder 30. Instead, the number of the reference pictures in List C 98 may be determined based on the number of reference pictures included in either of List 0 94 or List 1 96.

As a second bit reduction approach, video decoder 30 may receive a differentially signaled index of a reference picture for each entry in List C 70. In this case, instead of receiving the explicitly signaled index value of a reference picture for List C 98, video decoder 30 receives an index delta, i.e., delta_ref_idx_list_curr_minus 1, for the reference picture to indicate a difference (e.g., an offset) between an index of the current reference picture in the current reference picture list and an index of a previous reference picture in the same reference picture list that was added to a previous entry in List C 98. For each reference picture list indicated by pic_from_list_0_flag and each value of i, therefore, video decoder 30 receives the delta_ref_idx_list_curr_minus1 syntax element that indicates a differentially coded index iden-

TABLE 3

| ref_pic_list_combination( ) { | C | Descriptor |
|---|---|---|
|    if( slice_type % 5 = = 1 ) { // b slice | | |
|       ref_pic_list_combination_flag | 2 | u(1) |
|       if(ref_pic_list_combination_flag ) { | | |
|          com_list_equal_idc | 2 | u(2) |
|          if (com_list_equal_idc = = 0) { | | |
|             num_com_ref_list_active_minus1 | 2 | ue(v) |
|             for (i =0; i <= num_com_ref_list_active_minus1; i++) { | | |
|                pic_from_list_0_flag | 2 | u(1) |
|                delta_ref_idx_list_curr_minus1 | 2 | ue(v) |
|             } | | |
|       } | | |
|    } | | |
| } | | |

In the example of Table 3, as in Table 2, if the current slice type is a B slice, a bit flag, i.e., ref_pic_list_combination_flag, indicates that the List C 98 is to be used for uni-directional prediction of video blocks in the B slice. A value of the ref_pic_list_combination_flag equal to 0 indicates that List 0 94 and List 1 96 are identical, i.e., the B slice is a GPB slice, and video decoder 30 may set List C 98 equal to List 0 94 or tifying the particular reference picture to pull from the current reference picture list, List 0 94 or List 1 96, to append at the end of List C 98.

In this case, video decoder 30 may determine the index of the reference picture in the current reference picture list based on the indicated index delta, i.e., delta_ref_idx_list_curr_minus1, and the previously indicated index of the previous reference picture from the current reference picture list, i.e., PreRefIdxLx, where x indicates the current reference picture list, CurrRefPicList, as either List 0 94 or List 1 96. For example, x is equal to 0 to indicate List 0 94 when the pic_from_list_0_flag has a value equal to 1, and x is equal to 1 to indicate List 1 96 when the pic_from_list_0_flag is has a value equal to 0. Video decoder 30 may calculate the index of the reference picture in List C 70, i.e., CurRef_Idx_Lx, as: delta_ref_idx_list_curr_minus1+1+PreRefIdxLx. PreRefIdxL0 and PreRefIdxL1 are set to −1 at the start of the loop.

As an example, if the previous index from the current reference picture list was equal to 2 and the current index from the current reference picture list is equal to three, the delta index may have a value of 1. In this case, the alternative techniques may reduce bit consumption for signaling the index value of a current reference picture by coding a delta index value of 1, instead of an explicit index value of 3. This bit reduction is generally applicable to all the signaled index values, because the index values of the reference pictures included in List C 98 from a given one of List 0 94 and List 1 96 are typically in increasing order and increase by small increments.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Figure 4:
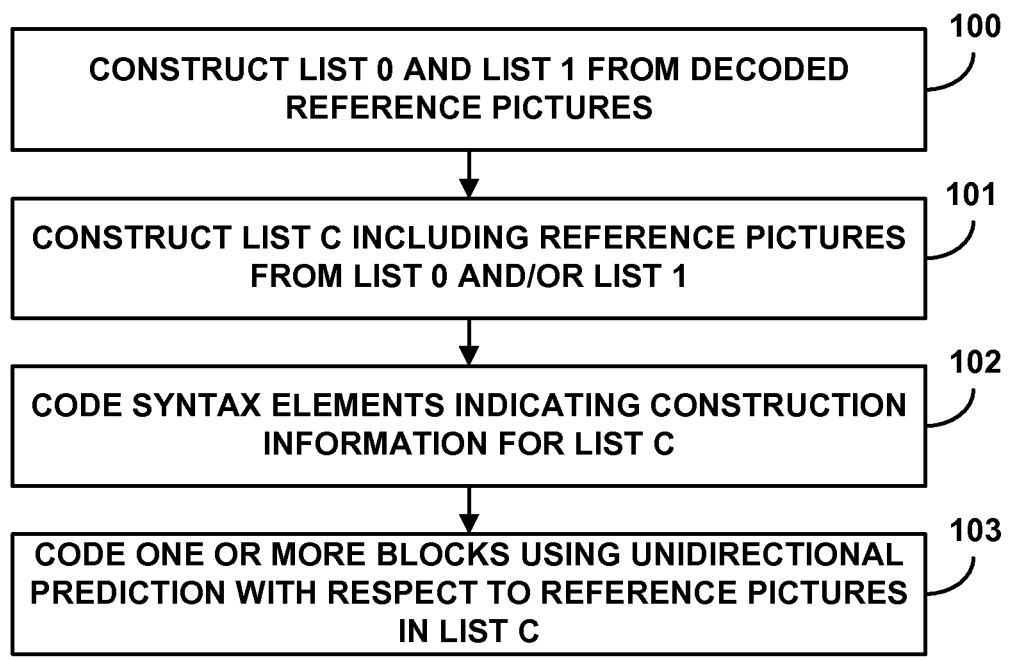
FIG. 4 is a flowchart illustrating an example operation of constructing list C and coding uni-directional predicted video blocks using List C.

FIG. 4 is a flowchart illustrating an example operation of constructing a combined reference picture list, List C, and coding uni-directional predicted video blocks using List C. The illustrated operation is described with reference to video encoder 20 of FIG. 2 and video decoder 30 of FIG. 3.

Video encoder 20 receives video blocks of a current video slice to be encoded. When the current video slice is designated as a B slice, video encoder 20 constructs List 0 66 and List 1 68 based on decoded reference pictures stored in reference picture memory 64 (100). Video encoder 20 may construct List 0 66 and List 1 68 according to normal reference picture list construction procedures. Video encoder 20 then constructs List C 70 including one or more reference pictures from List 0 66 and/or List 1 68 (101). For example, video encoder 20 selects one or more reference pictures from at least one of List 0 66 and List 1 68 to be included in List C 70. In other examples, video encoder 20 may construct List C 70 by setting List C 70 equal to one of List 0 66 and List 1 68.

In addition, video encoder 20 encodes one or more syntax elements to indicate construction information for List C 70 to video decoder 30 (102). For example, video encoder 20 may encode syntax elements to indicate that List C 70 is used for uni-directional prediction, and to indicate a number of reference pictures identified in List C 70 and a reference picture index for each entry in List C 70. Video encoder 20 may then encode one or more video blocks of the B slice using uni-directional prediction with respect to one or more reference pictures in List C 70 (103).

Video decoder 30 receives an encoded bitstream representing video blocks of a current video slice and syntax elements associated with the video slice from video encoder 20. When the current video slice is designated as a B slice, video decoder 30 constructs List 0 94 and List 1 96 based on decoded reference pictures stored in reference picture memory 92 using the syntax elements (100). Video decoder 30 may construct List 0 94 and List 1 96 according to normal reference picture list construction procedures, including initialization and modification.

Video decoder 30 then constructs List C 98 including one or more reference pictures from List 0 94 and/or List 1 96 (101). Video decoder 30 constructs List C 98 by decoding syntax elements that indicate construction information for List C 98 (102). For example, video decoder 30 may decode syntax elements that indicate that List C 98 is used for uni-directional prediction, and that indicate a number of reference pictures identified in List C 98 and a reference picture index for each entry in List C 98. As an example, video decoder 30 may add one or more reference pictures from at least one of List 0 94 and List 96 to List C 98 according to the syntax element. In other examples, video decoder 30 may construct List C 98 by setting List C 98 equal to one of List 0 94 and List 1 96. Video decoder 30 may then decode one or more video blocks of the B slice using uni-directional prediction with respect to one or more reference pictures in List C 98 (103).

Figure 5:
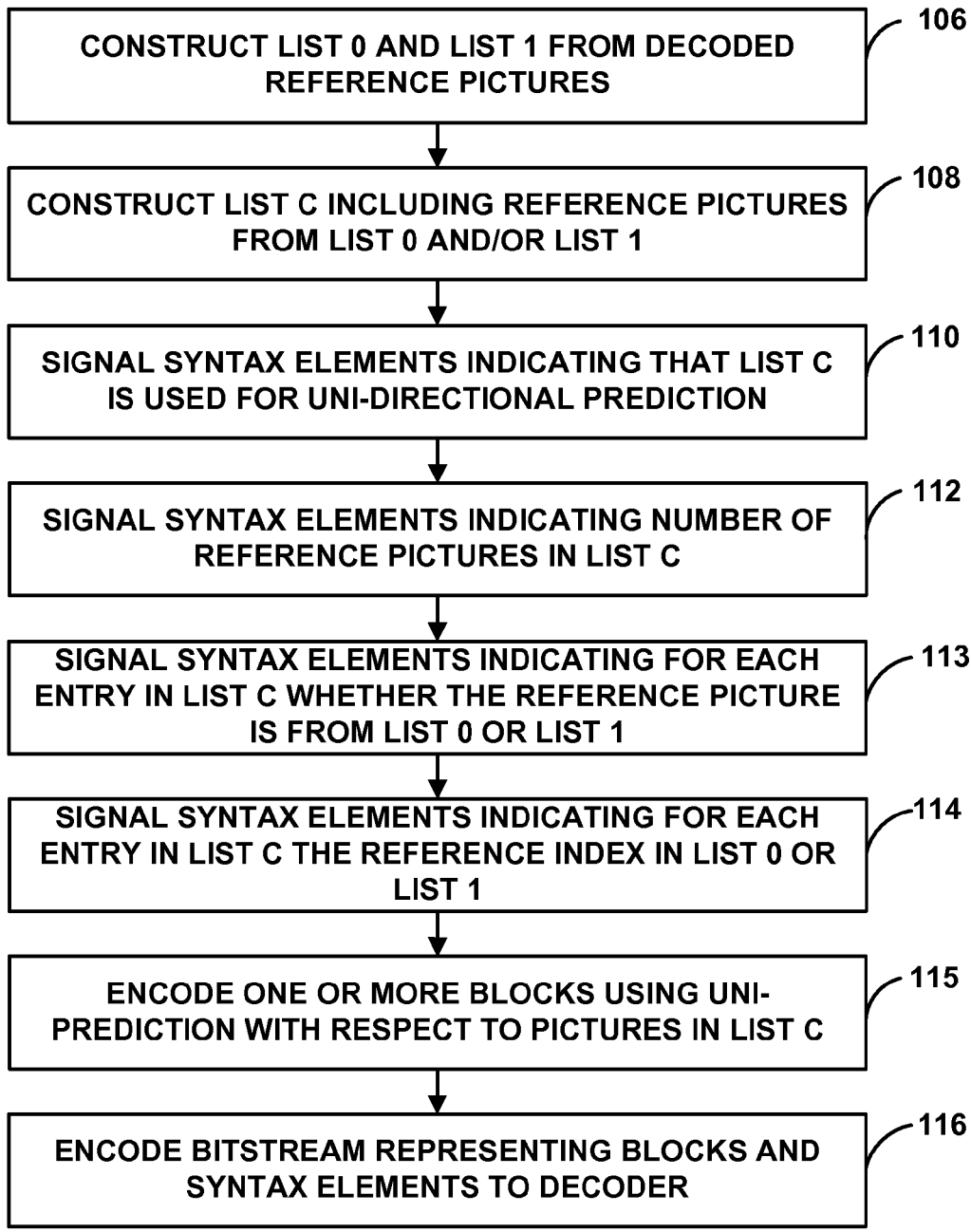
FIG. 5 is a flowchart illustrating an example operation of encoding syntax elements indicating construction information for List C and encoding uni-directional predicted video blocks using List C.

FIG. 5 is a flowchart illustrating an example operation of encoding one or more syntax elements indicating construction information for constructing a combined reference picture list, List C 70, and encoding video blocks using uni-directional prediction with respect to reference pictures in only List C 70. The illustrated operation is described with reference to video encoder 20 of FIG. 2, and may correspond to the combined reference picture list syntax table presented in Table 2 and Table 3 above.

Video encoder 20 receives video blocks of a current video slice to be encoded. When the current video slice is designated as a B slice, video encoder 20 constructs List 0 66 and List 1 68 based on decoded reference pictures stored in reference picture memory 64 (106). Video encoder 20 may construct List 0 66 and List 1 68 according to normal reference picture list construction procedures.

Video encoder 20 may also construct a combined reference picture list, List C 70, including one or more reference pictures from List 0 66 and/or List 1 68 for uni-directional prediction of B slices (108). In one example, video encoder 20 may select all the reference pictures in both List 0 66 and List 1 68 to be included in List C 70. In this case, the number of reference pictures in List C 70 may be equal to the sum of the number of reference pictures in List 0 66 and List 1 68. In other cases, one or more of the reference pictures indicated by List 0 66 and List 1 68 may overlap. List C 70 may be constructed to eliminate redundant reference pictures such that the number of reference pictures in List C 70 may be less than the sum of the number of reference pictures in List 0 66 and List 1 68. In other examples, video encoder 20 may select less than all of the reference pictures in List 0 66 and List 1 68 to be included in List C 70.

In some cases, video encoder 20 may not construct List C 70 from List 0 66 and List 1 68, but, instead, will set List C 70 equal to one of List 0 66 and List 1 68. In the case where List 0 66 and List 1 68 are identical, i.e., the B slice is a GPB slice, video encoder 20 uses List 0 66 as the combined reference picture list. Video encoder 20 then encodes syntax elements indicating that List C 70 is equal to List 0 66. In other examples, List C 70 may be indicated as being equal to List 1 68. In this case, the techniques may reduce a cost of coding construction information for a combined reference picture list by encoding a one-bit flag, i.e., ref_pic_list_combination_flag, to indicate whether List C 70 is constructed from List 0 66 and List 1 68 or merely set equal to one of the reference picture lists. If List C 70 is not constructed from List 0 66 and List 1 68, video encoder 20 does not encode additional syntax elements to explicitly signal the manner in which the contents of List C 70 should be constructed from List 0 66 and List 1 68 by video decoder 30.

When List 0 66 and List 1 68 are not identical, video encoder 20 may determine whether one of List 0 66 and List 1 68 is a subset of the other list. For example, the reference pictures identified in List 0 66 may comprise a subset of the reference pictures identified in List 1 68. When one of List 0 66 and List 1 68 is a subset of the other list, video encoder 20 sets List C 70 equal to the other list. Video encoder 20 then encodes syntax elements indicating that List C 70 is equal to the other list. For example, when the reference pictures identified in List 0 66 are a subset of the reference pictures identified in List 1 68, List C 70 may be set equal to List 1 68. In this case, the techniques reduce a cost of coding construction information for List C 70 by encoding a two-bit flag, i.e., com_list_equal_idc, to indicate whether List C 70 is explicitly signaled or equal to one of List 0 66 and List 1 68. If List C 70 is equal to either List 0 66 or List 1 68, video encoder 20 does not encode additional syntax elements to explicitly signal the manner in which the contents of List C 70 should be constructed from List 0 66 and List 1 68 by video decoder 30.

Video encoder 20 then signals syntax elements indicating that List C 70 is used for uni-directional prediction of B slices (110). In addition, video encoder 20 encodes one or more syntax elements to explicitly signal the manner in which the contents of List C 70 should be constructed from List 0 66 and List 1 68 by video decoder 30. Specifically, video encoder 20 signals syntax elements indicating a number of reference pictures identified in List C 70 (112). As an alternative, video encoder 20 may signal the number of overlapping reference pictures in List 0 66 and List 1 68, i.e., the number of pictures that are the same in List 0 66 and List 1 68. The number of reference pictures in List C 70 may then be determined based on the indicated number of reference pictures in List 0 66, the indicated number of reference pictures in List 1, and the indicated number of overlapping reference pictures.

Video encoder 20 also signals syntax elements indicating whether a reference picture is from List 0 66 or List 1 68 for each entry in List C 70 (113). Video encoder 20 further signals syntax elements indicating a reference picture index for each entry in List C 70 (114). Explicitly signaling the number of reference frames in List C 70 and each entry in List C 70 enables video decoder 30 to construct the combined reference picture list without requiring complicated decoding processes.

Video encoder 20 may then encode one or more video blocks of the B slice using uni-directional prediction with respect to reference pictures in List C 70 (115). According to the techniques, video encoder 20 may encode the uni-directional predicted video blocks using List C 70 regardless of how the combined reference list is formed. Each coded video block of the B slice may then have an associated inter-prediction status syntax element, i.e., inter_pred_idc, to indicate whether the video block is bi-predicted from List 0 66 and List 1 68 (Bi) or uni-directional predicted from List C 70 (Pred_LC). The techniques, therefore, result in reducing a cost of coding inter-prediction status for video blocks in B slices, including GPB slices regardless of whether List 0 and List 1 are identical. Explicitly signaling the number of reference frames in List C 70 also enables video decoder 30 to parse the inter-prediction status syntax elements associated with each video block in the coded B slice. Video encoder 20 may then encode a bitstream representing the video blocks of the current video slice and the syntax elements associated with the video slice to be decoded by video decoder 30 (116).

Figure 6:
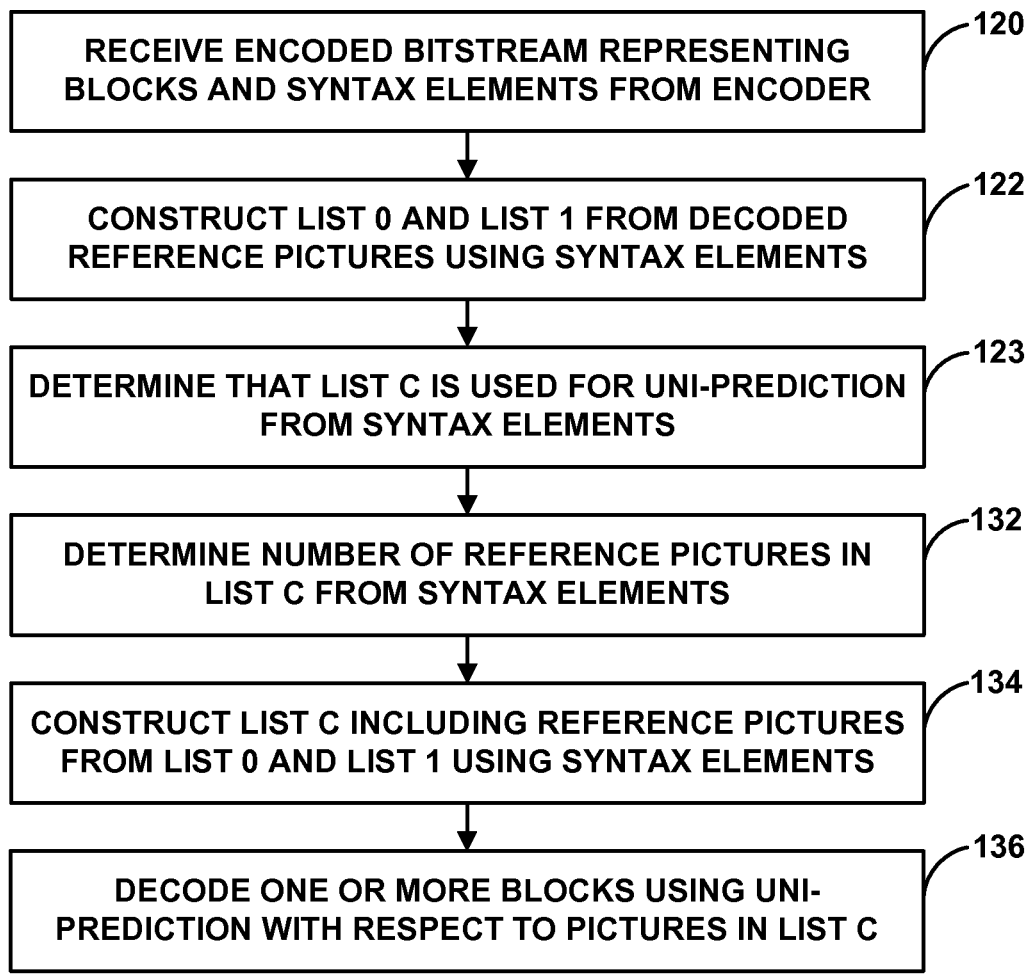
FIG. 6 is a flowchart illustrating an example operation of constructing List C using syntax elements and decoding uni-directional predicted video blocks using List C.

FIG. 6 is a flowchart illustrating an example operation of constructing List C using syntax elements and decoding uni-directional predicted video blocks using List C. The illustrated operation is described with reference to video decoder 30 of FIG. 3, and may correspond to the combined reference picture list syntax table presented in Table 2 and Table 3 above.

Video decoder 30 receives an encoded bitstream representing video blocks of a current video slice and syntax elements associated with the video slice from video encoder 20 (120). When the current video slice is designated as a B slice, video decoder 30 constructs List 0 94 and List 1 96 based on decoded reference pictures stored in reference picture memory 92 using the syntax elements (122). Video decoder 30 may construct List 0 94 and List 1 96 according to normal reference picture list construction procedures, including initialization and modification. Video decoder 30 then determines whether a combined reference picture list, List C 98, is used for uni-directional prediction of B slices from the received syntax elements (123).

In order to construct List C 98, video decoder 30 first determines a number of reference pictures in List C 98 from the syntax elements received from video encoder 20 (132). In one example, List C 98 may include all the reference pictures in both List 0 94 and List 1 96. In this case, the number of reference pictures in List C 98 may be equal to the sum of the number of reference pictures in List 0 94 and List 1 96.

In other cases, one or more of the reference pictures indicated by List 0 94 and List 1 96 may overlap. List C 98 may be constructed to eliminate redundant reference pictures such that the number of reference pictures in List C 98 may be less than the sum of the reference pictures in List 0 94 and List 1 96. In other examples, List C 98 may include less than all of the reference pictures in List 0 94 and List 1 96 depending on the selections performed video encoder 20.

Video decoder 30 then constructs List C 98 including one or more reference pictures from List 0 94 and/or List 1 96 using the syntax elements that explicitly signal the manner in which the contents of List C 98 should be constructed from List 0 94 and List 1 96 (134). For example, video decoder 30 may construct List C 98 based on syntax elements that indicate whether each entry in List C 98 relates to a reference picture in List 0 94 or a reference picture in List 1 96, and indicate an index of the reference picture in the current reference picture list for each entry in List C 98. Example operations for constructing List C 98 are described in more detail below with respect to FIGS. 7 and 8. Explicitly signaling the number of reference frames in List C 98 and each entry in List C 98 enables video decoder 30 to construct List C 98 without requiring complicated decoding processes.

In some cases, video decoder 30 may not construct List C 98 from List 0 94 and List 1 96, but, instead, will set List C 98 equal to one of List 0 94 and List 1 96. In the case where List 0 94 and List 1 96 are identical, i.e., the B slice is a GPB slice, video decoder 30 sets List C 98 equal to List 0 94. In other examples, List C 98 may be set equal to List 1 96. Video decoder 30 may determine that List 0 94 and List 1 96 are identical based on a one-bit flag, i.e., ref_pic_list_combination_flag, received from video encoder 20 that indicates whether List C 98 is constructed from List 0 94 and List 1 96 or merely set equal to one of the reference picture lists. If List C 98 is not constructed from List 0 94 and List 1 96, video decoder 30 knows that List 0 94 and List 1 96 are identical and that List C 98 may be set equal to one of List 0 94 and List 1 96. In this case, video decoder 30 does not receive additional syntax elements that explicitly signal the manner in which the contents of List C 98 should be constructed from List 0 94 and List 1 96 by video decoder 30.

When List 0 94 and List 1 96 are not identical, video decoder 30 determines whether one of List 0 94 and List 1 96 is a subset of the other list. For example, the reference pictures identified in List 0 94 may comprise a subset of the reference pictures identified in List 1 96. When one of List 0 94 and List 1 96 is a subset of the other list, video decoder 30 sets List C 98 equal to the other list. For example, when the reference pictures identified in List 0 94 are a subset of the reference pictures identified in List 1 96, List C 98 may be set equal to List 1 96.

Video decoder 30 may determine that one of List 0 94 and List 1 96 is a subset of the other list based on a two-bit flag, i.e., com_list_equal_idc, received from video encoder 20 that indicates whether List C 98 is explicitly signaled or equal to one of List 0 94 and List 1 96. If List C 98 is equal to either List 0 94 or List 1 96, video decoder 30 sets List C 98 equal to either List 0 94 or List 1 96. Video decoder 30 does not receive additional syntax elements that explicitly signal the manner in which the contents of List C 98 should be constructed from List 0 94 and List 1 96.

After List C 98 is constructed, video decoder 30 may then decode one or more video blocks of the B slice using uni-directional prediction with respect to reference pictures in List C 98 (136). According to the techniques, video decoder 30 may decode the uni-directional predicted video blocks using List C 98 regardless of how List C is formed. Each coded video block of the B slice may then have an associated inter-prediction status syntax element, i.e., inter_pred_idc, to indicate whether the video block is bi-predicted from List 0 94 and List 1 96 (Bi) or uni-directional predicted from List C 98 (Pred_LC). Explicitly signaling the number of reference frames in List C 98 also enables video decoder 30 to parse the inter-prediction status syntax elements associated with each video block in the coded B slice.

Figure 7:
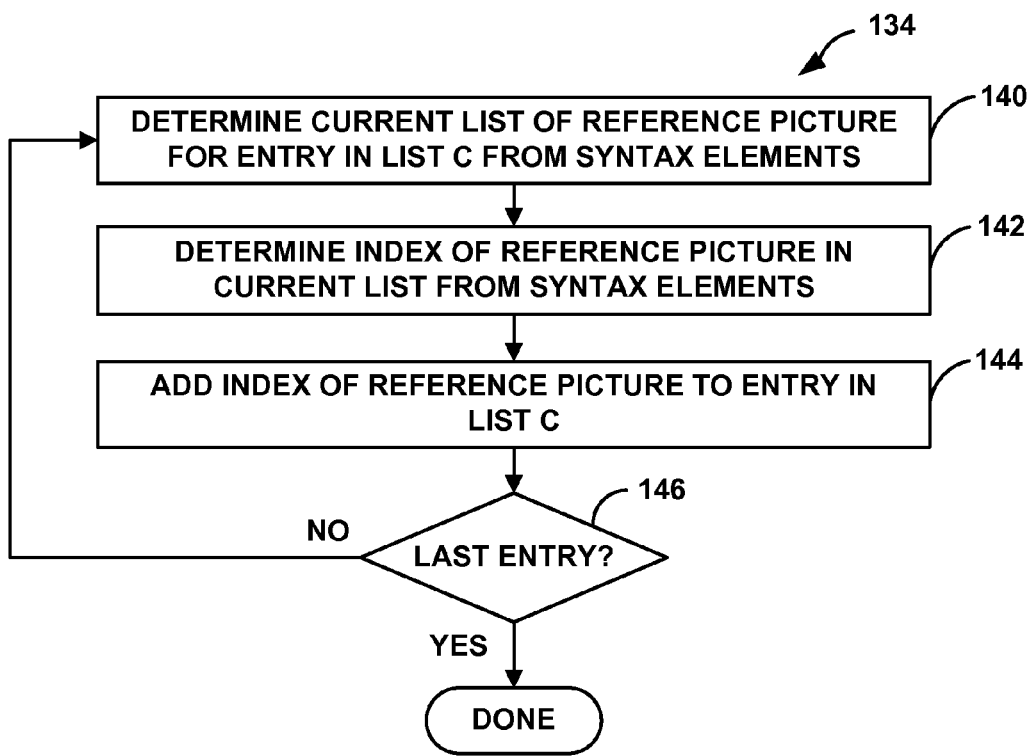
FIG. 7 is a flowchart illustrating a first example operation of constructing List C using syntax elements.

FIG. 7 is a flowchart illustrating a first example operation of constructing List C 98 using syntax elements that explicitly indicate how to construct List C 98, step 134 from FIG. 6. The illustrated operation is described with reference to video decoder 30 of FIG. 3, and may correspond to the example combined reference picture list syntax table presented in Table 2 above.

Video decoder 30 determines a number of reference pictures identified in List C 98 from the syntax elements in order to know how many entries are included in List C 98. Video decoder 30 then constructs List C 98 by adding a reference index of a reference picture in either List 0 94 or List 1 96 to each entry in List C 98. More specifically, video decoder 30 may first determine the current list, either List 0 94 or List 1 96, of a current reference picture to be added into a given entry of List C 98 from the syntax elements (140). For example, video decoder 30 may determine the current list based on a one-bit flag, i.e., pic_from_list_0_flag(i), where i identifies the entry in List C 98, that indicates whether the current reference picture for the entry is from List 0 94 or List 1 96.

Video decoder 30 then determines an index of the current reference picture in the current reference picture list, List 0 94 or List 1 96, from the syntax elements (142). For example, video decoder 30 may determine the index of the current reference picture based on a syntax element, i.e., ref_idx_list_ curr(i), where i identifies the entry in List C 98, that indicates the reference index of the current reference picture in the current reference picture list to be added to List C 98. Video decoder 30 then adds the index of the current reference picture to the entry in List C 98 (144).

If the entry in List C 98 is the last entry in List C 98 (YES branch of 146), then video decoder 30 is done constructing List C 98 and may use List C 98 to decode uni-directional predicted video blocks of the B slice. If the entry in List C 98 is not the last entry in List C 98 (NO branch of 146), video decoder 30 continues to construct List C 98 by adding a reference index of a reference picture in either List 0 94 or List 1 96 to each entry in List C 98 (140, 142, 144).

Figure 8:
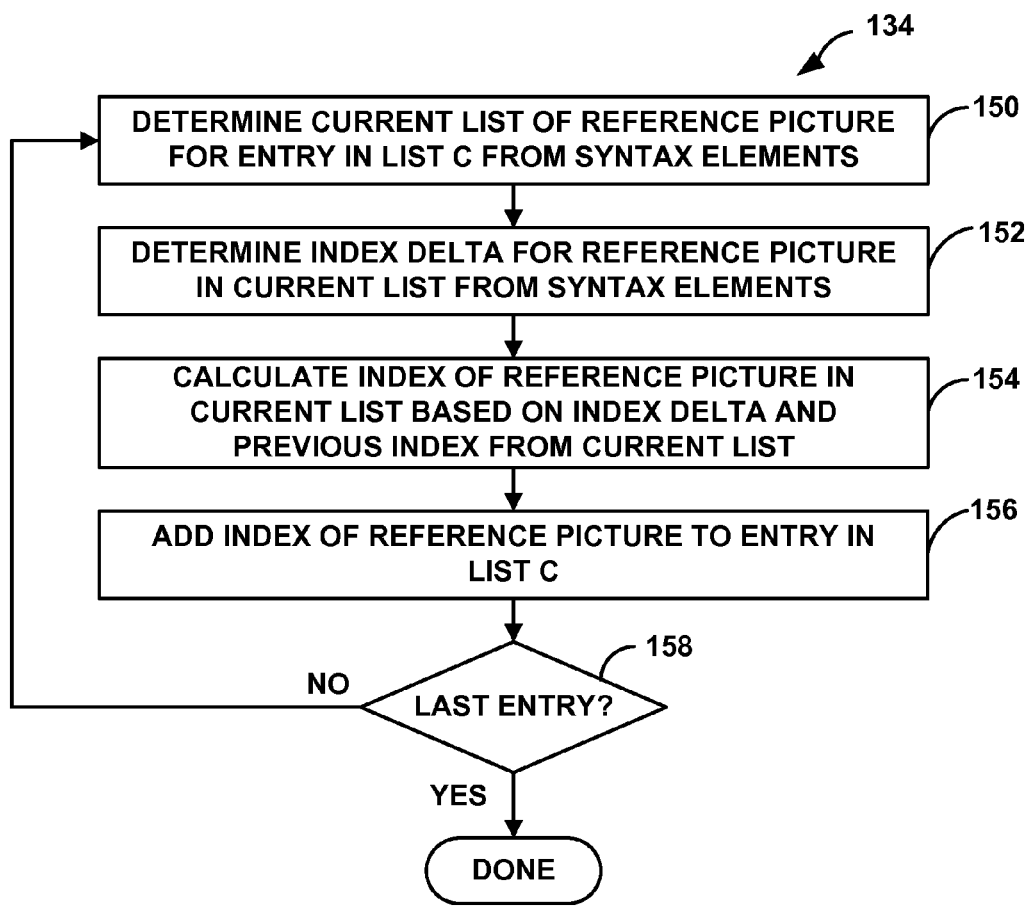
FIG. 8 is a flowchart illustrating a second example operation of constructing List C using syntax elements.

FIG. 8 is a flowchart illustrating a second example operation of constructing List C 98 using syntax elements that explicitly indicate how to construct List C 98, step 134 from FIG. 6. The illustrated operation is described with reference to video decoder 30 of FIG. 3, and may correspond to the example combined reference picture list syntax table presented in Table 3 above.

Video decoder 30 determines a number of reference pictures identified in List C 98 from the syntax elements in order to know how many entries are included in List C 98. Video decoder 30 then constructs List C 98 by adding a reference index of a reference picture in either List 0 94 or List 1 96 to each entry in List C 98. More specifically, video decoder 30 may first determine the current list, either List 0 94 or List 1 96, of a current reference picture to be added into a given entry of List C 98 from the syntax elements (150). For example, video decoder 30 may determine the current list based on a one-bit flag, i.e., pic_from_list_0_flag(i), where i identifies the entry in List C 98, that indicates whether the current reference picture for the entry is from List 0 94 or List 1 96.

Video decoder 30 then determines an index delta for the current reference picture in the current reference picture list, List 0 94 or List 1 96, from the syntax elements (152). The index delta defines a difference between an index of the current reference picture in the current reference picture list and an index of a previous reference picture in the current reference picture list that was added to a previous entry in List C 98. Video decoder 30 may then calculate the index of the current reference picture in the current reference picture list based on the index delta and the index of the previous reference picture from the current reference picture list (154). Video decoder 30 then adds the index of the current reference picture to the entry in List C 98 (156).

In this way, the techniques reduce a cost of explicitly signaling the reference index of each reference picture identified in List C 98. Instead, video encoder 20 may signal only the differences between index values to be added into List C 98 from each of the List 0 94 and List 1 96. The index values of reference pictures included in List C 98 from a given one of List 0 94 and List 1 96 are typically in increasing order and increase by small increments.

If the entry in List C 98 is the last entry in List C 98 (YES branch of 158), then video decoder 30 is done constructing List C 98 and may use List C 98 to decode uni-directional predicted video blocks of the B slice. If the entry in List C 98 is not the last entry in List C 98 (NO branch of 158), video decoder 30 continues to construct List C 98 by adding a reference index of a reference picture in either List 0 94 or List 1 96 to each entry in List C 98 (150, 152, 154, 156).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of coding video data comprising:
   constructing a first reference picture list and a second reference picture list from a memory storing decoded reference pictures;
   constructing a combined reference picture list including one or more reference pictures from at least one of the first reference picture list and the second reference picture list;
   coding one or more syntax elements indicating construction information for the combined reference picture list, wherein the syntax elements explicitly indicate the construction information for the combined reference picture list including indicating a number of reference pictures identified in the combined reference picture list, indicating an index of a reference picture in one of the first reference picture list or the second reference picture list to be added to each entry in the combined reference picture list, and indicating for each entry in the combined reference picture list whether the reference picture is from the first reference picture list or the second reference picture list; and
   coding one or more video blocks using uni-directional prediction with respect to one or more reference pictures in the combined reference picture list.

2. The method of claim 1, wherein the syntax elements indicate that the combined reference picture list is used for uni-directional prediction.

3. The method of claim 1, wherein the method of coding video data comprises a method of decoding video data, further comprising:
   receiving with a decoder an encoded bitstream representing the video blocks and the syntax elements;
   decoding the one or more syntax elements;
   constructing the combined reference picture list using the syntax elements; and
   decoding the one or more uni-directional predicted video blocks using the combined reference picture list.

4. The method of claim 1, wherein the method of coding video data comprises a method of encoding video data, further comprising:
   encoding the one or more syntax elements;
   encoding the one or more uni-directional predicted video blocks using only the combined reference picture list; and
   encoding a bitstream representing the video blocks and the syntax elements.

5. The method of claim 1, further comprising, for each video block, coding one or more syntax elements indicating whether the video block is coded using bi-prediction with respect to one reference picture in the first reference picture list and one reference picture in the second reference picture list or using uni-directional prediction with respect to one or more reference pictures in the combined reference picture list.

6. The method of claim 1, wherein the syntax elements indicate the number of reference pictures identified in the combined reference picture list based on a number of reference pictures in the first reference picture list that are the same as reference pictures in the second reference picture list.

7. The method of claim 1, wherein indicating the index of the reference picture to be added to each entry in the combined reference picture list comprises indicating, for each entry in the combined reference picture list, an index delta that defines a difference between the index of the reference picture in one of the first or second reference picture lists to be added to a current entry in the combined reference picture list and an index of a previous reference picture in the same one of the first or second reference pictures lists that was added to a previous entry in the combined reference picture list.

8. The method of claim 1, wherein, when the first and second reference picture lists are identical, the one or more syntax elements indicate that the combined reference picture list is set equal to one of the first and second reference picture lists for uni-directional prediction.

9. The method of claim 8, wherein the one or more syntax elements indicate the number of reference pictures identified in the combined reference picture list based on the number of reference pictures identified in the one of the first and second reference picture lists.

10. The method of claim 1, wherein, when one of the first and second reference picture lists identifies a subset of the reference pictures identified in the other reference picture list, the one or more syntax elements indicate that the combined reference picture list is set equal to the other reference picture list for uni-directional prediction.

11. The method of claim 10, wherein the one or more syntax elements indicate the number of reference pictures identified in the combined reference picture list based on the number of reference pictures identified in the other reference picture list.

12. A video coding device comprising:
a memory that stores decoded reference pictures; and
a processor configured to:
construct a first reference picture list and a second reference picture list from the memory,
construct a combined reference picture list including one or more reference pictures from at least one of the first reference picture list and the second reference picture list,
code one or more syntax elements indicating construction information for the combined reference picture list, wherein the syntax elements explicitly indicate the construction information for the combined reference picture list including indicating a number of reference pictures identified in the combined reference picture list, indicating an index of a reference picture in one of the first reference picture list or the second reference picture list to be added to each entry in the combined reference picture list, and indicating for each entry in the combined reference picture list whether the reference picture is from the first reference picture list or the second reference picture list, and
code one or more video blocks using uni-directional prediction with respect to one or more reference pictures in the combined reference picture list.

13. The video coding device of claim 12, wherein the syntax elements indicate that the combined reference picture list is used for uni-directional prediction.

14. The video coding device of claim 12, wherein the video coding device comprises a video decoding device, wherein the processor:

receives an encoded bitstream representing the video blocks and the syntax elements;
decodes the one or more syntax elements;
constructs the combined reference picture list using the syntax elements; and
decodes the one or more uni-directional predicted video blocks using the combined reference picture list.

15. The video coding device of claim 12, wherein the video coding device comprises a video encoding device, wherein the processor:
encodes the one or more syntax elements;
encodes the one or more uni-directional predicted video blocks using only the combined reference picture list; and
encodes a bitstream representing the video blocks and the syntax elements.

16. The video coding device of claim 12, wherein, for each video block, the processor codes one or more syntax elements indicating whether the video block is coded using bi-prediction with respect to one reference picture in the first reference picture list and one reference picture in the second reference picture list or using uni-directional prediction with respect to one or more reference pictures in the combined reference picture list.

17. The video coding device of claim 12, wherein the syntax elements indicate the number of reference pictures identified in the combined reference picture list based on a number of reference pictures in the first reference picture list that are the same as reference pictures in the second reference picture list.

18. The video coding device of claim 12, wherein, to indicate the index of the reference picture to be added to each entry in the combined reference picture list, the one or more syntax elements indicate, for each entry in the combined reference picture list, an index delta that defines a difference between the index of the reference picture in one of the first or second reference picture lists to be added to a current entry in the combined reference picture list and an index of a previous reference picture in the same one of the first or second reference pictures lists that was added to a previous entry in the combined reference picture list.

19. The video coding device of claim 12, wherein, when the first and second reference picture lists are identical, the one or more syntax elements indicate that the combined reference picture list is set equal to one of the first and second reference picture lists for uni-directional prediction.

20. The video coding device of claim 19, wherein the one or more syntax elements indicate the number of reference pictures identified in the combined reference picture list based on the number of reference pictures identified in the one of the first and second reference picture lists.

21. The video coding device of claim 12, wherein, when one of the first and second reference picture lists identifies a subset of the reference pictures identified in the other reference picture list, the one or more syntax elements indicate that the combined reference picture list is set equal to the other reference picture list for uni-directional prediction.

22. The video coding device of claim 21, wherein the one or more syntax elements indicate the number of reference pictures identified in the combined reference picture list based on the number of reference pictures identified in the other reference picture list.

23. A video coding device comprising:
means for constructing a first reference picture list and a second reference picture list from a memory storing decoded reference pictures;

means for constructing a combined reference picture list including one or more reference pictures from at least one of the first reference picture list and the second reference picture list;

means for coding one or more syntax elements indicating construction information for the combined reference picture list, wherein the syntax elements explicitly indicate the construction information for the combined reference picture list including indicating a number of reference pictures identified in the combined reference picture list, indicating an index of a reference picture in one of the first reference picture list or the second reference picture list to be added to each entry in the combined reference picture list, and indicating for each entry in the combined reference picture list whether the reference picture is from the first reference picture list or the second reference picture list; and means for coding one or more video blocks using uni-directional prediction with respect to one or more reference pictures in the combined reference picture list.

24. The video coding device of claim 23, wherein the syntax elements indicate that the combined reference picture list is used for uni-directional prediction.

25. The video coding device of claim 23, wherein the video coding device comprises a video decoding device, further comprising:

means for receiving with a decoder an encoded bitstream representing the video blocks and the syntax elements;

means for decoding the one or more syntax elements;

means for constructing the combined reference picture list using the syntax elements; and means for decoding the one or more uni-directional predicted video blocks using the combined reference picture list.

26. The video coding device of claim 23, wherein the video coding device comprises a video encoding device, further comprising:

means for encoding the one or more syntax elements;

means for encoding the one or more uni-directional predicted video blocks using only the combined reference picture list; and means for encoding a bitstream representing the video blocks and the syntax elements.

27. The video coding device of claim 23, further comprising means for coding, for each video block, one or more syntax elements indicating whether the video block is coded using bi-prediction with respect to one reference picture in the first reference picture list and one reference picture in the second reference picture list or using uni-directional prediction with respect to one or more reference pictures in the combined reference picture list.

28. A non-transitory computer-readable storage medium comprising instructions for coding video data that, upon execution in a processor, cause the processor to:

construct a first reference picture list and a second reference picture list from a memory storing decoded reference pictures;

construct a combined reference picture list including one or more reference pictures from at least one of the first reference picture list and the second reference picture list;

code one or more syntax elements indicating construction information for the combined reference picture list, wherein the syntax elements explicitly indicate the construction information for the combined reference picture list including indicating a number of reference pictures identified in the combined reference picture list, indicating an index of a reference picture in one of the first reference picture list or the second reference picture list to be added to each entry in the combined reference picture list, and indicating for each entry in the combined reference picture list whether the reference picture is from the first reference picture list or the second reference picture list; and code one or more video blocks using uni-directional prediction with respect to one or more reference pictures in the combined reference picture list.

29. The non-transitory computer-readable storage medium of claim 28, wherein the syntax elements indicate that the combined reference picture list is used for uni-directional prediction.

30. The non-transitory computer-readable storage medium of claim 28, wherein the video coding device comprises a video decoding device, further comprising instructions that cause the processor to:

receive with a decoder an encoded bitstream representing the video blocks and the syntax elements;

decode the one or more syntax elements;

construct the combined reference picture list using the syntax elements; and decode the one or more uni-directional predicted video blocks using the combined reference picture list.

31. The non-transitory computer-readable storage medium of claim 28, wherein the video coding device comprises a video encoding device, further comprising instructions that cause the processor to:

encode the one or more syntax elements;

encode the one or more uni-directional predicted video blocks using only the combined reference picture list; and encode a bitstream representing the video blocks and the syntax elements.

32. The non-transitory computer-readable storage medium of claim 28, further comprising instructions that cause the processor to code, for each video block, one or more syntax elements indicating whether the video block is coded using bi-prediction with respect to one reference picture in the first reference picture list and one reference picture in the second reference picture list or using uni-directional prediction with respect to one or more reference pictures in the combined reference picture list.

* * * * *